(12) United States Patent
Kawada

(10) Patent No.: US 10,670,520 B2
(45) Date of Patent: Jun. 2, 2020

(54) OPTICAL ANALYSIS DEVICE AND OPTICAL ANALYSIS METHOD

(71) Applicant: HAMAMATSU PHOTONICS K.K., Hamamatsu-shi, Shizuoka (JP)

(72) Inventor: Yoichi Kawada, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/193,069

(22) Filed: Nov. 16, 2018

(65) Prior Publication Data

US 2019/0154574 A1 May 23, 2019

(30) Foreign Application Priority Data

Nov. 21, 2017 (JP) .................. 2017-223400

(51) Int. Cl.
*G01N 21/3581* (2014.01)
*G01N 21/21* (2006.01)
(Continued)

(52) U.S. Cl.
CPC ......... *G01N 21/3581* (2013.01); *G01N 21/21* (2013.01); *G01N 21/23* (2013.01);
(Continued)

(58) Field of Classification Search
CPC .... G02N 21/21; G02N 21/3581; G02N 21/42; G02N 21/3586; H01L 31/09
See application file for complete search history.

(56) References Cited

U.S. PATENT DOCUMENTS

| | | | | |
|---|---|---|---|---|
| 2004/0196660 | A1* | 10/2004 | Usami | G01N 21/3581 362/458 |
| 2014/0264032 | A1* | 9/2014 | Neshat | G01J 3/42 250/339.08 |

FOREIGN PATENT DOCUMENTS

| | | |
|---|---|---|
| JP | 2005-070358 A | 3/2005 |
| JP | 2008-076324 A | 4/2008 |

(Continued)

OTHER PUBLICATIONS

Katletz, Stefan, et al., "Polarization sensitive terahertz imaging: detection of birefringence and optical axis," Optics Express, vol. 20, No. 21 (2012), 23025-23035.

(Continued)

*Primary Examiner* — Yara B Green

(74) *Attorney, Agent, or Firm* — Faegre Drinker Biddle & Reath LLP

(57) ABSTRACT

In an optical analysis device, a terahertz wave generation module includes a terahertz wave generation unit, and a polarization switching unit that periodically switches a polarization state of a terahertz wave between a first polarization state and a second polarization state that are different from each other on the basis of a frequency signal. An electric field vector measurement unit detects a first electric field vector of a terahertz wave in a first polarization state and a second electric field vector of the terahertz wave in a second polarization state by referring to a frequency signal. An optical parameter analysis unit determines an optical parameter of a measurement target from an intersection between first analysis data based on spectral data obtained by performing Fourier transformation on a product of the first electric field vector and a rotation matrix and second analysis data based on spectral data obtained by performing Fourier transformation on a product of the second electric field vector and the rotation matrix.

11 Claims, 13 Drawing Sheets

(51) Int. Cl.
 *G01N 21/35* (2014.01)
 *G01N 21/23* (2006.01)
(52) U.S. Cl.
 CPC ............... *G01N 2021/3595* (2013.01); *G01N 2201/0683* (2013.01)

(56) References Cited

FOREIGN PATENT DOCUMENTS

| JP | 2010-008139 A | 1/2010 |
| JP | 2010-223586 A | 10/2010 |
| JP | 2012-208098 A | 10/2012 |
| JP | 2015-503750 A | 2/2015 |
| JP | 2016-99309 A | 5/2016 |
| WO | WO 2013/101252 A1 | 7/2013 |

OTHER PUBLICATIONS

Kim, Youngchan, et al., "Investigation of THz birefringence measurement and calculation in $Al_2O_3$ and $LiNbO_3$," Applied Optics, vol. 50, No. 18 (2011), 2906-2910.

Yoichi Kawada, "Study on Control and Measurement of a Polarization State of Broadband Terahertz Pulses and Their Applications", Yokohama National University, Graduate School of Engineering, Mar. 2019, p. 1-p. 166 (Partial English-language translation).

* cited by examiner

OPTICAL ANALYSIS DEVICE AND OPTICAL ANALYSIS METHOD

TECHNICAL FIELD

The present disclosure relates to an optical analysis device and an optical analysis method.

BACKGROUND

In the related art, there is a method of deriving an optical parameter of an anisotropic material. For example, Y. Kim et al., "Investigation of THz birefringence measurement and calculation in $Al_2O_3$ and $LiNbO_3$", Appl. Opt. 50, 2906, (2011) discloses a method of acquiring a temporal waveform of a terahertz pulse for each rotation angle of an anisotropic material and deriving a complex refractive index of each axis after an orientation of the axis is determined. S. Katletz et al., "Polarization sensitive terahertz imaging: detection of birefringence and optical axis", Opt. Express 20, 23025, (2012) discloses a method of probing an anisotropic material using a terahertz pulse with circular polarization and deriving a birefringence parameter by analyzing a result of probing using a predetermined calculation equation. Japanese Unexamined Patent Publication No. 2016-99309 discloses a method of directly detecting an electric field vector of a terahertz wave by using an electro-optical crystal obtained by cutting out a (111) plane of an optically isotropic medium as a terahertz wave detection element and performing probing with a terahertz wave by setting probe light that is ultrashort pulse light to circular polarization.

SUMMARY

However, in the method described in Y. Kim et al., "Investigation of THz birefringence measurement and calculation in $Al_2O_3$ and $LiNbO_3$", Appl. Opt. 50, 2906, (2011), there is concern regarding the labor and time for measurement that may be required since the temporal waveform is acquired for each angle while the anisotropic material is rotated by a predetermined angle. Further, it is necessary to acquire the temporal waveform by finely changing the angle in order to determine the orientation of the axis with high resolution, and simple measurement is difficult.

On the other hand, in the method described in S. Katletz et al., "Polarization sensitive terahertz imaging: detection of birefringence and optical axis", Opt. Express 20, 23025, (2012), measurement is difficult due to properties of the calculation equation to be used, unless a measurement target has a certain thickness or a refractive index difference between a fast axis and a slow axis of the measurement target is large. Further, in this method, since it is assumed that there is no chromatic dispersion of the refractive index in the anisotropic material, it is difficult to measure a material having a distribution of an absorption peak or the like. Thus, in the method described in S. Katletz et al., "Polarization sensitive terahertz imaging: detection of birefringence and optical axis", Opt. Express 20, 23025, (2012), there is a limitation on measurement targets which can be measured, and simple measurement is difficult.

The present disclosure has been made in view of the above problems, and an object of the present disclosure is to provide an optical analyzing device and an optical analyzing method capable of conveniently measuring an optical parameter of a measurement target.

An optical analysis device according to an aspect is an optical analysis device that analyzes an optical parameter of a measurement target having anisotropy, the optical analysis device including: a terahertz wave generation module that generates a terahertz wave; a terahertz wave detection unit that detects the terahertz wave generated by the terahertz wave generation module; a placement portion for the measurement target disposed on an optical path of the terahertz wave between the terahertz wave generation module and the terahertz wave detection unit; an electric field vector measurement unit that measures an electric field vector of the terahertz wave detected by the terahertz wave detection unit; an optical parameter analysis unit that analyzes an optical parameter of the measurement target on the basis of a measurement result of the electric field vector from the electric field vector measurement unit; and a frequency signal generation unit that generates a predetermined frequency signal. The terahertz wave generation module includes a terahertz wave generation unit that generates the terahertz wave according to incidence of light, and a polarization switching unit that periodically switches a polarization state of the terahertz wave between a first polarization state and a second polarization state that are different from each other on the basis of the frequency signal. The electric field vector measurement unit detects a first electric field vector of the terahertz wave in the first polarization state and a second electric field vector of the terahertz wave in the second polarization state by referring to the frequency signal. The optical parameter analysis unit determines an optical parameter of the measurement target from an intersection between first analysis data based on spectral data obtained by performing Fourier transformation on a product of the first electric field vector and a rotation matrix and second analysis data based on spectral data obtained by performing Fourier transformation on a product of the second electric field vector and the rotation matrix.

In the optical analysis device, the first electric field vector of the terahertz wave in the first polarization state and the second electric field vector of the terahertz wave in the second polarization state transmitted through the measurement target are measured by the electric field vector measurement unit. The first analysis data and the second analysis data including the optical parameter of the measurement target are obtained by the optical parameter analysis unit analyzing results of the measurement. Here, since the optical parameter of the measurement target does not depend on the polarization state of the terahertz wave, a correct value of the optical parameter is common in both the first analysis data and the second analysis data. Therefore, it is possible to uniquely determine the optical parameter of the measurement target from the intersection of the first analysis data and the second analysis data. Further, in the optical analysis device, the polarization state of the terahertz wave transmitted through the measurement target is periodically switched between the first polarization state and the second polarization state that are different from each other on the basis of the frequency signal generated by the frequency signal generation unit, and the first electric field vector and the second electric field vector of the terahertz wave are detected by the electric field vector measurement unit by referring to the frequency signal. Accordingly, it is possible to easily switch the polarization state of the terahertz wave and efficiently measure the first electric field vector and the second electric field vector to be used for a determination of the optical parameter of the measurement target. Therefore, it is possible to easily measure the optical parameter of the measurement target.

The optical parameter analysis unit may obtain the first analysis data using, as a reference, the first electric field vector obtained in a state in which the measurement target is not placed in the placement portion and also obtain the second analysis data using, as a reference, the second electric field vector obtained in a state in which the measurement target is not placed in the placement portion. Thus, by using, as a reference, the terahertz wave in a state in which the measurement target is not placed, it is possible to derive an absolute value of the optical parameter.

The electric field vector measurement unit may include a reference signal generation unit that generates a first reference signal corresponding to the first frequency signal and a second reference signal of which a phase is inverted with respect to the first reference signal, and an electric field vector detection unit that detects a first electric field vector using the first reference signal and detects a second electric field vector using the second reference signal. Accordingly, it is possible to accurately distinguish and detect the first electric field vector of the terahertz wave in the first polarization state and the second electric field vector of the terahertz wave in the second polarization state.

The polarization switching unit may include an electro-optical element that switches a polarization state of the light directed to the terahertz wave generation unit according to an applied voltage, and a voltage application unit that applies a voltage to the electro-optical element at a period based on the frequency signal. In this case, it is possible to switch the polarization state of the terahertz wave with a simple configuration.

The polarization switching unit may include a ½ wave plate disposed at a stage before the electro-optical element, a ¼ wave plate disposed at a stage after the electro-optical element, a nonlinear optical crystal disposed at a stage after the ¼ wave plate, and a terahertz wave plate disposed at a stage after the nonlinear optical crystal, wherein a polarization state of the terahertz wave of linear polarization generated in the nonlinear optical crystal may be switched between clockwise circular polarization and counterclockwise circular polarization. By using the clockwise circular polarization and the counterclockwise circular polarization, it is possible to prevent complication of calculation when the first analysis data and the second analysis data are acquired from the first electric field vector and the second electric field vector.

The polarization switching unit may include: a ½ wave plate disposed at a stage before the electro-optical element, a nonlinear optical crystal disposed at a stage after the electro-optical element, and a terahertz wave plate disposed at a stage after the nonlinear optical crystal, wherein a polarization state of the terahertz wave of linear polarization generated in the nonlinear optical crystal may be switched between clockwise circular polarization and counterclockwise circular polarization. By using the clockwise circular polarization and the counterclockwise circular polarization, it is possible to prevent complication of calculation when the first analysis data and the second analysis data are acquired from the first electric field vector and the second electric field vector.

The terahertz wave generation unit may include a nonlinear optical crystal. The nonlinear optical crystal has a property of generating the terahertz wave according to the incidence of the light and converting the polarization state of the terahertz wave. By using this property, it is possible to suitably realize the first polarization state and the second polarization state of the terahertz wave.

The optical parameter may include at least one of an orientation angle of an optical axis, a refractive index, an extinction coefficient, and a dielectric constant.

The terahertz wave may include a plurality of different frequency components, and the optical parameter analysis unit may determine the optical parameter for each of the plurality of frequency components. In this case, for example, it is possible to improve measurement accuracy by obtaining an average of the optical parameters acquired for the respective frequency components.

The optical parameter analysis unit may derive an indicator of variation of the optical parameter analyzed for each of the plurality of frequency components. For example, it is possible to improve the measurement accuracy by selecting a parameter with a small degree of variation when the orientation of the optical axis of the anisotropic material is determined.

An optical analysis method according to an aspect is an optical analysis method of analyzing an optical parameter of a measurement target having anisotropy, the optical analysis method including: a terahertz wave generation step of generating a terahertz wave; a sample measurement step of measuring an electric field vector of the terahertz wave input to the measurement target; and an analysis step of analyzing an optical parameter of the measurement target on the basis of a measurement result of the electric field vector obtained in the sample measurement step. The terahertz wave generation step includes generating the terahertz wave according to incidence of light, and periodically switching a polarization state of the terahertz wave between a first polarization state and a second polarization state that are different from each other on the basis of a predetermined frequency signal. The sample measurement step includes detecting a first electric field vector of the terahertz wave in the first polarization state and a second electric field vector of the terahertz wave in the second polarization state by referring to the frequency signal. The analysis step includes determining an optical parameter of the measurement target from an intersection between first analysis data based on spectral data obtained by performing Fourier transformation on a product of the first electric field vector and a rotation matrix and second analysis data based on spectral data obtained by performing Fourier transformation on a product of the second electric field vector and the rotation matrix.

In the optical analysis method, the first electric field vector of the terahertz wave in the first polarization state and the second electric field vector of the terahertz wave in the second polarization state transmitted through the measurement target are measured. The first analysis data and the second analysis data including the optical parameter of the measurement target are obtained by analyzing results of the measurement. Here, since the optical parameter of the measurement target does not depend on the polarization state of the terahertz wave, a correct value of the optical parameter is common in both the first analysis data and the second analysis data. Therefore, it is possible to uniquely determine the optical parameter of the measurement target from the intersection of the first analysis data and the second analysis data. Further, in the optical analysis method, the polarization state of the terahertz wave transmitted through the measurement target is periodically switched between the first polarization state and the second polarization state that are different from each other on the basis of the frequency signal, and the first electric field vector and the second electric field vector of the terahertz wave are detected by referring to the frequency signal. Accordingly, it is possible to easily switch the polarization state of the terahertz wave and efficiently measure the first electric field vector and the second electric field vector to be used for a determination of the optical parameter of the measurement target. Therefore, it is possible to easily measure the optical parameter of the measurement target.

DETAILED DESCRIPTION

Figure 1:
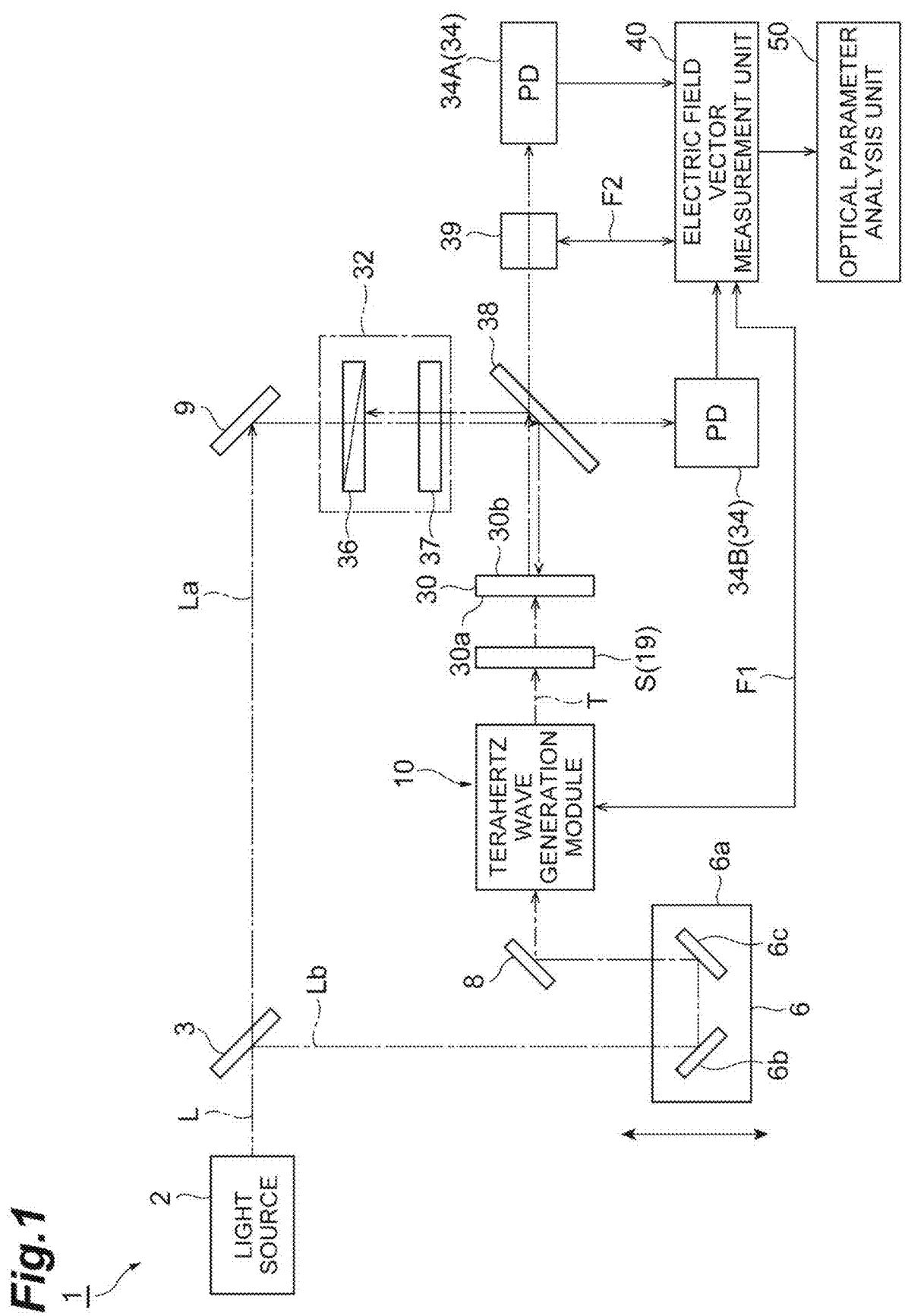
FIG. 1 is a configuration diagram illustrating an optical analysis device according to an embodiment.

Hereinafter, an embodiment of an optical analysis device and an optical analysis method of the present disclosure will be described in detail with reference to the accompanying drawings. In the description of the drawings, the same elements are denoted by the same reference numerals, and redundant description will be omitted as appropriate.

FIG. 1 is a diagram illustrating an optical analysis device 1 according to an embodiment. The optical analysis device 1 analyzes optical parameters of a measurement target S having optical anisotropy, such as a birefringent material. The optical parameters may be, for example, an orientation angle of an optical axis, a refractive index, an extinction coefficient, a dielectric constant, or the like of the measurement target S. As illustrated in FIG. 1, the optical analysis device 1 includes a terahertz wave generation module 10, a terahertz wave detection element (a terahertz wave detection unit) 30, and a placement portion 19 for a measurement target S. The terahertz wave T output from the terahertz wave generation module 10 is incident on the measurement target S placed in the placement portion 19. The terahertz wave T incident on the measurement target S is detected by the terahertz wave detection element 30. Hereinafter, the optical analysis device 1 will be described in detail.

The optical analysis device 1 includes a light source 2 that emits a femtosecond laser as emission light L, a beam splitter 3 that splits the emission light L from the light source 2 into probe light La and pump light Lb, a delay stage 6 that temporally delays the pump light Lb with respect to the probe light La, the terahertz wave generation module 10 that generates a terahertz wave T, a terahertz wave detection element 30 that detects the terahertz wave T, the placement portion 19 disposed on an optical path between the terahertz wave generation module 10 and the terahertz wave detection element 30, a polarization adjustment unit 32 that adjusts polarization of the probe light La, a photodetector 34 that detects the probe light La, an electric field vector measurement unit 40, and an optical parameter analysis unit 50.

The femtosecond laser emitted from the light source 2 has, for example, a wavelength of 800 nm, a pulse width of 100 fs, a repetition frequency of 100 MHz, and an average output of 500 mW. The delay stage 6 includes, for example, a stage 6a capable of reciprocating in an optical axis direction of the pump light Lb split by the beam splitter 3, and a pair of mirrors 6b and 6c that turn down the pump light Lb. The pump light Lb having passed through the delay stage 6 is guided to the terahertz wave generation module 10 by the mirror 8.

Figure 2:
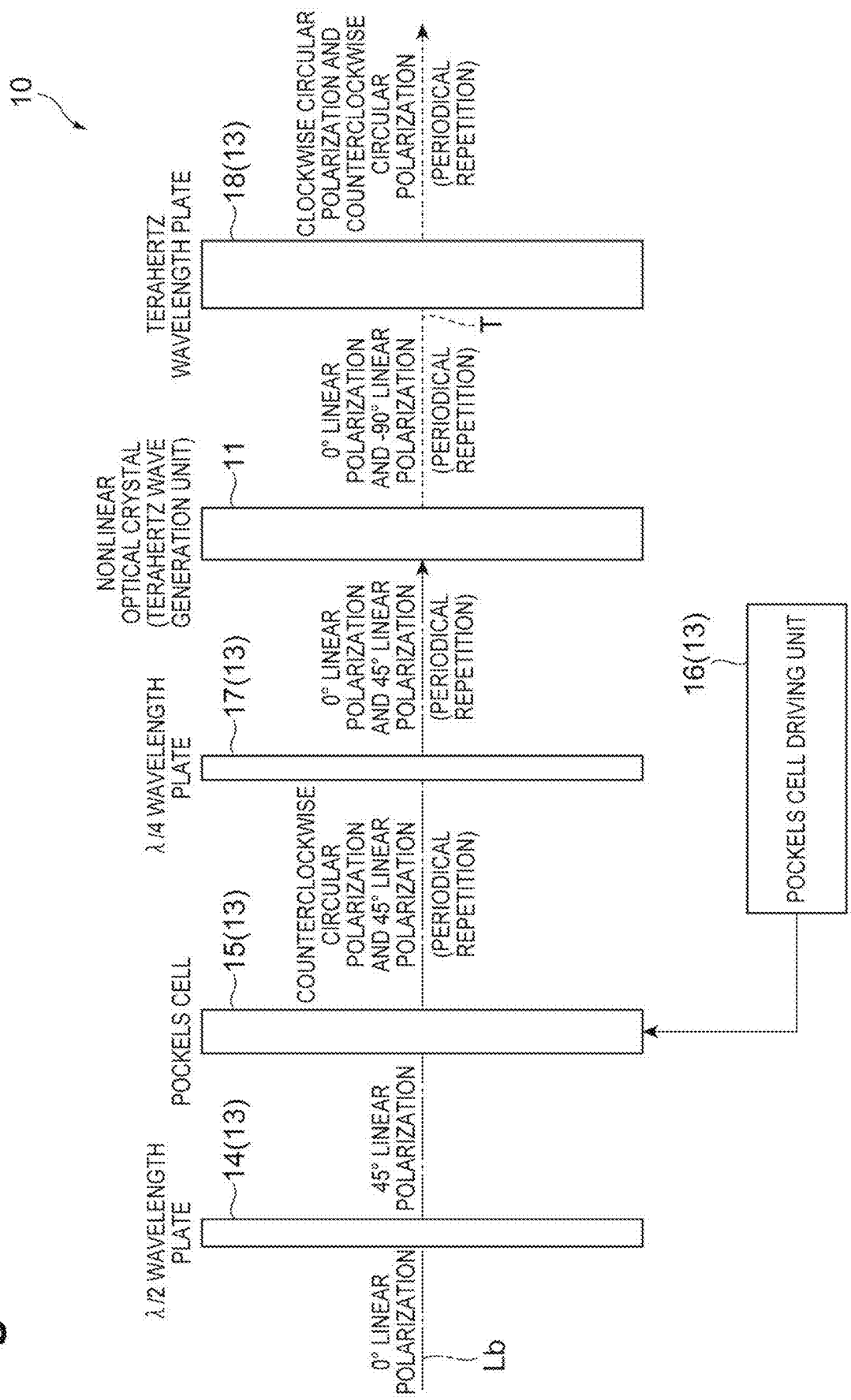
FIG. 2 is a configuration diagram illustrating a terahertz wave generation module.

FIG. 2 is a configuration diagram illustrating the terahertz wave generation module 10. The pump light Lb guided by the mirror 8 is incident on the terahertz wave generation module 10. In the embodiment, a polarization state of the pump light Lb incident on the terahertz wave generation module 10 from the mirror 8 is linear polarization in which a horizontal direction is a reference polarization direction (0°). The terahertz wave generation module 10 includes a terahertz wave generation unit 11 that generates a terahertz wave T according to the incidence of the pump light Lb, and a polarization switching unit 13 that switches a polarization state of the terahertz wave T generated from the terahertz wave generation unit 11.

The terahertz wave generation unit 11 includes, for example, a nonlinear optical crystal obtained by cutting out a (111) plane of ZnTe which is an optically isotropic medium. Generally, a pulse width of the terahertz wave T generated from the these elements is about several picoseconds. The pump light Lb incident on the terahertz wave generation unit (the nonlinear optical crystal) 11 is converted into a terahertz wave T according to a nonlinear optical effect. The terahertz wave T includes, for example, a frequency component in a band of 0.1 THz to 3 THz. In the embodiment, a direction of a crystal axis of the nonlinear optical crystal 11 coincides with a reference polarization direction. When the polarization direction of the incident pump light Lb is inclined by an angle θ with respect to the crystal axis of the nonlinear optical crystal 11, an angle of the polarization direction of the terahertz wave T generated in the nonlinear optical crystal 11 is inclined by −2θ with respect to the polarization direction of the incident pump light Lb. On the other hand, when the crystal axis of the nonlinear optical crystal 11 coincides with the polarization direction of the incident pump light Lb, the polarization direction of the terahertz wave T generated in the nonlinear optical crystal 11 is the same as the polarization direction of the incident pump light Lb.

On the basis of the first frequency signal F1 (see FIG. 1) output from the electric field vector measurement unit 40, the polarization switching unit 13 periodically alternately switches the polarization state of the incident terahertz wave T between a first polarization state and a second polarization state different from each other. For example, the polarization switching unit 13 according to the embodiment includes a ½ wave plate 14, a Pockels cell 15 (electro-optical element), a Pockels cell driving unit 16 (a voltage application unit), a ¼ wave plate 17, and a terahertz wave plate 18.

The ½ wave plate 14 is disposed at a stage before the Pockels cell 15 (that is, on the upstream side in a light traveling direction). Specifically, the ½ wave plate 14 is disposed on an optical path between the mirror 8 (see FIG. 1) and the Pockels cell 15. In the embodiment, the ½ wave plate 14 converts the polarization state of the pump light Lb from 0° linear polarization to 45° linear polarization.

The Pockels cell 15 is an element that controls the polarization state of the pump light Lb according to an electro-optic effect. The Pockels cell 15 is disposed at a stage after the ½ wave plate 14 (that is, on the downstream side in the light traveling direction). The Pockels cell 15 is disposed on the optical path between the ½ wave plate 14 and the ¼ wave plate 17. The Pockels cell 15 switches the polarization state of the pump light Lb traveling from the ½ wave plate 14 to the nonlinear optical crystal 11 according to an applied voltage. In the embodiment, the direction of the main axis of the Pockels cell 15 is inclined by 45° with respect to the reference polarization direction. The Pockels cell 15 functions as a ¼ wave plate in a period in which a voltage is applied, and does not function as a ¼ wave plate in a period in which no voltage is applied and maintains the polarization state of the incident pump light Lb as it is.

The Pockels cell driving unit 16 is electrically connected to the Pockels cell 15. The first frequency signal F1 (see FIG. 1) is input from the electric field vector measurement unit 40 to the Pockels cell driving unit 16. The Pockels cell driving unit 16 applies a voltage to the Pockels cell 15 at a period (for example, 1 kHz) on the basis of the first frequency signal F1. The polarization state of the pump light Lb passing through the Pockels cell 15 is periodically switched between counterclockwise circular polarization and 45° linear polarization according to the voltage periodically applied by the Pockels cell driving unit 16.

The ¼ wave plate 17 is disposed at a stage after the Pockels cell 15. Specifically, the ¼ wave plate 17 is disposed on the optical path between the Pockels cell 15 and the nonlinear optical crystal 11. In the embodiment, the ¼ wave plate 17 converts the polarization state of the pump light Lb incident from the Pockels cell 15 from counterclockwise circular polarization to 0° linear polarization. In addition, the ¼ wave plate 17 maintains the polarization state of the pump light Lb incident from the Pockels cell 15 as 45° linear polarization. Therefore, when the polarization state of the incident pump light Lb is 0° linear polarization, the nonlinear optical crystal 11 generates a terahertz wave T with 0° linear polarization. On the other hand, when the polarized state of the incident pump light Lb is 45° linear polarization, the nonlinear optical crystal 11 generates a terahertz wave T with −90° linear polarization.

The terahertz wave plate 18 is disposed at a stage after the nonlinear optical crystal 11. The terahertz wave plate 18 is disposed on an optical path between the nonlinear optical crystal 11 and the terahertz wave detection element 30 (see FIG. 1). The terahertz wave plate 18 is a ¼ wave plate that is applicable to the terahertz wave T. In the embodiment, the terahertz wave plate 18 converts the polarization state of the incident terahertz wave T from 0° linear polarization to clockwise circular polarization (a first polarization state). In addition, the terahertz wave plate 18 converts the polarization state of the incident terahertz wave T from −90° linear polarization to counterclockwise circular polarization (second polarization state).

Summarizing the operation of the terahertz wave generation module 10 having the above configuration, the ½ wave plate 14 converts the polarization state of the pump light Lb from 0° linear polarization to 45° linear polarization, and the Pockels cell 15 periodically converts the polarization state of the pump light Lb into counterclockwise circular polarization or 45° linear polarization according to whether or not the voltage is applied by the Pockels cell driving unit 16. The ¼ wave plate 17 converts the counterclockwise circular polarization of the pump light Lb into 0° linear polarization and maintains the polarization state of the pump light Lb as 45° linear polarization. When the pump light Lb with 0° linear polarization is incident, the nonlinear optical crystal 11 generates the terahertz wave T with 0° linear polarization, and when the pump light Lb with 45° linear polarization is incident, the nonlinear optical crystal 11 generates the terahertz wave T with −90° linear polarization. The terahertz wave plate 18 converts the terahertz wave T with 0° linear polarization into the terahertz wave T with clockwise circular polarization and converts the terahertz wave T with −90° linear polarization into the terahertz wave T with counterclockwise circular polarization. Therefore, the terahertz wave generation module 10 periodically outputs the terahertz wave T with clockwise circular polarization and the terahertz wave T with counterclockwise circular polarization on the basis of the first frequency signal F1.

Referring back to FIG. 1, the placement portion 19 at which the measurement target S is placed is disposed on the optical path between the terahertz wave generation module 10 and the terahertz wave detection element 30. Therefore, when the measurement target S is placed in the placement portion 19, the terahertz wave T emitted from the terahertz wave generation module 10 is transmitted through the measurement target S and incident on the terahertz wave detection element 30. On the other hand, when the measurement target S is not placed in the placement portion 19, the terahertz wave T emitted from the terahertz wave generation module 10 is incident on the terahertz wave detection element 30 without being transmitted through the measurement target S. The placement portion 19 may be configured of, for example, a holder disposed such that a thickness direction of the measurement target S coincides with a propagation direction of the terahertz wave T.

The probe light La is guided to the polarization adjustment unit 32 via a mirror 9. The polarization adjustment unit 32 includes a polarizer 36 and a ¼ wave plate 37. The probe light La guided to the polarization adjustment unit 32 is converted into linearly polarized light in a predetermined direction by the polarizer 36 and further converted into circularly polarized light by the ¼ wave plate 37.

The probe light La converted into the circularly polarized light is divided in two while maintaining a polarization state by an unpolarized beam splitter 38. One of the parts of probe light La divided in two is guided to the terahertz wave detection element 30 and the other is guided to the second photodetector 34B.

The terahertz wave detection element 30 is configured of, for example, an electro-optical crystal obtained by cutting out a (111) plane of ZnTe which is an optically isotropic medium. One surface 30a of the terahertz wave detection element 30 is an incidence surface on which the terahertz wave T is incident. A reflection coating for transmitting the terahertz wave T and reflecting the probe light La is applied to the one surface 30a. On the other hand, the other surface 30b of the terahertz wave detection element 30 is an incidence surface on which the probe light La is incident. An antireflection coating for suppressing reflection of the probe light La is applied to the other surface 30b.

Figure 3:
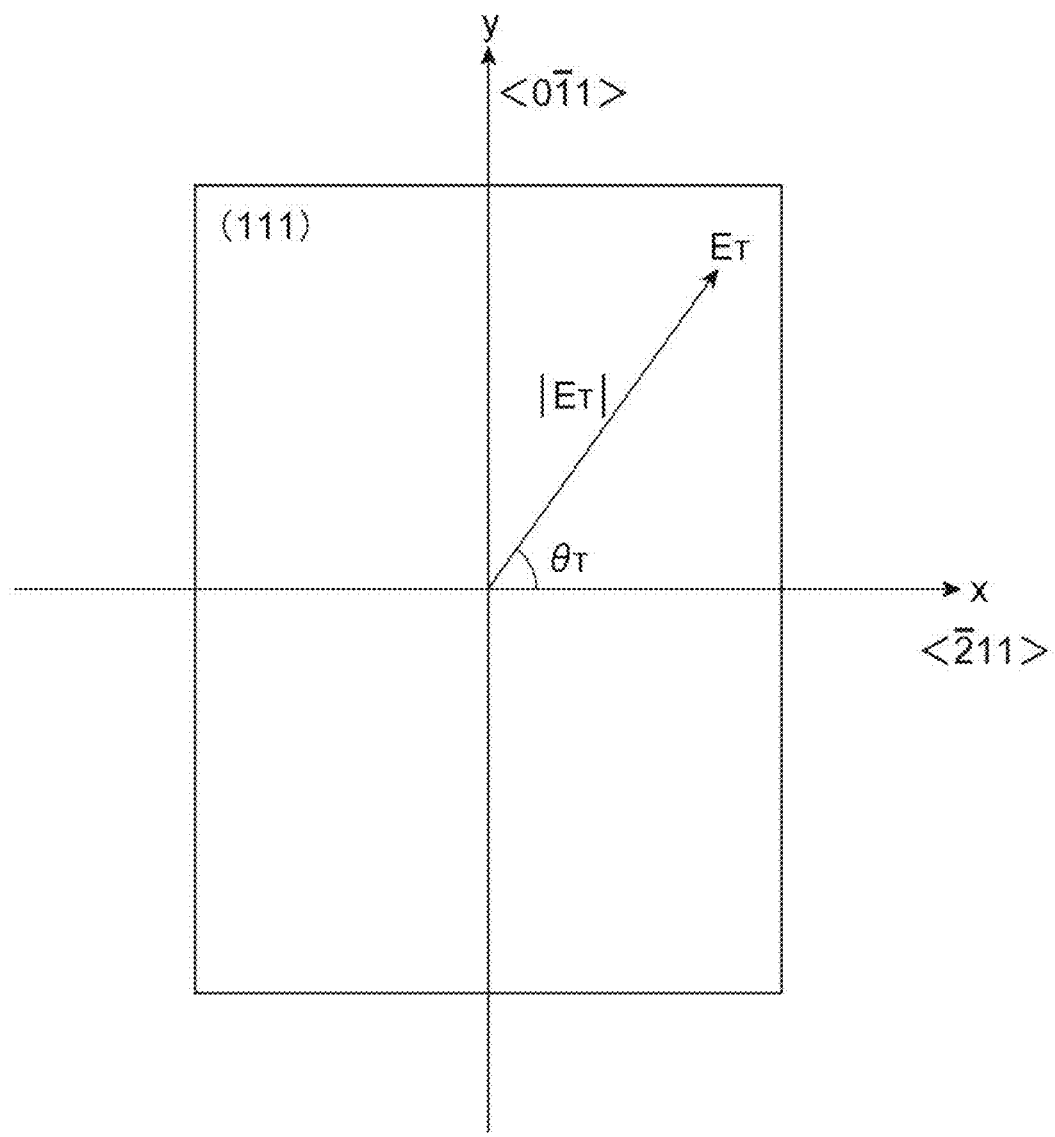
FIG. 3 is a diagram illustrating an electric field vector of a terahertz wave in a terahertz wave detection element.

FIG. 3 is a diagram illustrating the electric field vector of the terahertz wave T in the terahertz wave detection element 30. As illustrated in FIG. 3, the electric field vector $E_T$ of the terahertz wave T is represented by an amplitude $|E_T|$ and an orientation $\theta_T$. In the orientation $\theta_T$, a <−211> direction in a (111) plane of ZnTe is set to 0°, and a <0-11> direction is set as a positive direction with reference to the <-211> direction. When a tilt of the electric field of the terahertz wave T with respect to the <-211> direction is 2θ, birefringence is induced in a -θ direction. A magnitude of the birefringence induced according to an intensity of the terahertz wave T is constant regardless of the direction.

The probe light La incident on the terahertz wave detection element 30 is modulated according to the electric field of the terahertz wave T at an incidence timing, and the polarization state is changed to elliptical polarization or the like. The probe light La after probing with the terahertz wave T is reflected by the one surface 30a of the terahertz wave detection element 30 and is incident on the unpolarized beam splitter 38 again. One part of the probe light La divided in two is incident on the rotation analyzer 39 and the other becomes return light.

The rotation analyzer 39 is an element of which an analyzer is rotated in a plane by a motor or the like. The rotation analyzer 39 generates a second frequency signal F2 having a predetermined frequency and rotates at the frequency of the second frequency signal F2. The frequency of the second frequency signal F2 is set to, for example, about 20 Hz to 100 Hz independently of the first frequency signal F1. When the probe light La is incident on the analyzer, only specific linearly polarized light is output. Therefore, when the analyzer rotates, the probe light La is modulated. The probe light La modulated by the rotation analyzer 39 is incident on the first photodetector 34A. On the other hand, the return light of the probe light La is converted into elliptically polarized light close to linearly polarized light by the ¼ wave plate 37, and most of the return light is cut by the polarizer 36.

Each of the first photodetector 34A and the second photodetector 34B is, for example, a photodiode. The first photodetector 34A is a photodetector that detects the probe light La after probing with the terahertz wave T, and detects the probe light La modulated by the rotation analyzer 39. The second photodetector 34B is a photodetector that is used for monitoring power fluctuation, and detects the probe light La that has been transmitted through the unpolarized beam splitter 38 without traveling to the terahertz wave detection element 30.

Figure 4:
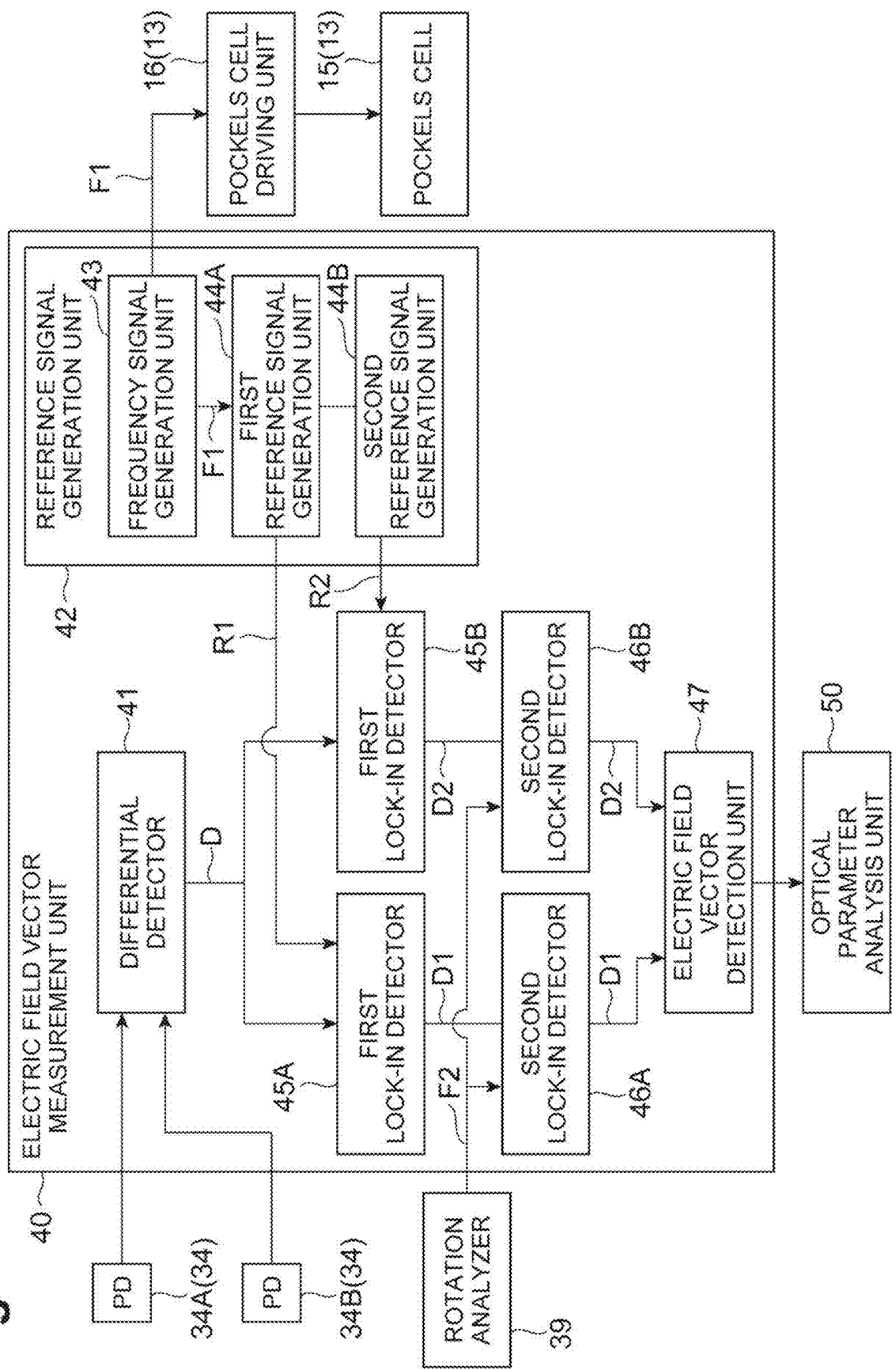
FIG. 4 is a block diagram illustrating an example of a configuration of an electric field vector measurement unit and an optical parameter analysis unit.

FIG. 4 is a block diagram illustrating an example of a configuration of the electric field vector measurement unit 40 and the optical parameter analysis unit 50. The electric field vector measurement unit 40 measures the electric field vector of the terahertz wave T detected by the terahertz wave detection element 30. As illustrated in FIG. 4, the electric field vector measurement unit 40 includes a differential detector 41, a reference signal generation unit 42, first lock-in detectors 45A and 45B, second lock-in detectors 46A and 46B, and an electric field vector detection unit 47.

The differential detector 41 is a unit that detects a difference between a detection signal from the first photodetector 34A and a detection signal from the second photodetector 34B. The differential detector 41 supplies a detection signal D on the basis of the difference between the detection signal from the first photodetector 34A and the detection signal from the second photodetector 34B to the first lock-in detectors 45A and 45B. This detection signal D includes a first detection signal D1 indicating the terahertz wave T in the first polarization state and a second detection signal D2 indicating the terahertz wave T in the second polarization state. By performing differential detection, a power variation component in the probe light La is removed. In this case, it is preferable for sensitivities of each of the first photodetector 34A and the second photodetector 34B to be adjusted such that an intensity of the detection signal D of the differential detector 41 becomes zero in a state in which the terahertz wave T is not incident.

The reference signal generation unit 42 includes a frequency signal generation unit 43, a first reference signal generator 44A, and a second reference signal generator 44B. The frequency signal generation unit 43 is electrically connected to the Pockels cell driving unit 16. The frequency signal generation unit 43 generates a first frequency signal F1 having a predetermined frequency (for example, a repetition frequency of 1 kHz). The frequency signal generation unit 43 outputs the generated first frequency signal F1 to the Pockets cell driving unit 16.

The first reference signal generator 44A is electrically connected to the frequency signal generation unit 43. The first reference signal generator 44A generates a first reference signal R1 corresponding to the first frequency signal F1. The first reference signal R1 periodically varies between 0 and 1 at the frequency of the first frequency signal F1. The second reference signal generator 44B is electrically connected to the frequency signal generation unit 43. The second reference signal generator 44B generates a second reference signal R2 of which a phase has been inverted with respect to the first reference signal R1. The second reference signal R2 periodically varies between 0 and 1 at the frequency of the first frequency signal F1. An arbitrary delay may be applied between the second reference signal R2 and the first reference signal R1, and a temporal width of the signal of 0 and 1 may be arbitrarily adjusted. Thus, the first detection signal D1 and the second detection signal D2 can be accurately separated according to an actual operation of the Pockels cell 15.

The first lock-in detector 45A is electrically connected to the differential detector 41 and the first reference signal generator 44A. The detection signal D from the differential detector 41 is input to the first lock-in detector 45A. Further, the first reference signal R1 from the first reference signal generator 44A is input to the first lock-in detector 45A. The first lock-in detector 45A detects only the first detection signal D1 among the first detection signal D1 and the second detection signal D2 included in the detection signal D by referring to the first reference signal R1.

The first lock-in detector 45B is electrically connected to the differential detector 41 and the second reference signal generator 44B. The detection signal D from the differential detector 41 is input to the first lock-in detector 45B. Further, the second reference signal R2 from the second reference signal generator 44B is input to the first lock-in detector 45B. The first lock-in detector 45B detects only the second detection signal D2 among the first detection signal D1 and the second detection signal D2 by referring to the second reference signal R2.

The second lock-in detector 46A is electrically connected to each of the first lock-in detector 45A and the rotation analyzer 39. The second lock-in detector 46A performs lock-in detection of the first detection signal D1 from the first lock-in detector 45A. The second lock-in detector 46A of the embodiment is a two-phase lock-in detector and simultaneously detects an amplitude and a phase of the first detection signal D1 that changes in synchronization with the frequency of a reference signal. The second lock-in detector 46A performs, for example, lock-in detection of the first detection signal D1 with the frequency of the reference signal set as a frequency twice the frequency of the second frequency signal F2 obtained from the rotation analyzer 39.

The second lock-in detector 46B is electrically connected to each of the first lock-in detector 45B and the rotation analyzer 39. The second lock-in detector 46B performs lock-in detection of the second detection signal D2 from the first lock-in detector 45B. The second lock-in detector 46B of the embodiment is a two-phase lock-in detector and simultaneously detects an amplitude and a phase of the second detection signal D2 that changes in synchronization with the frequency of a reference signal. The second lock-in detector 46B performs, for example, lock-in detection of the second detection signal D2 with the frequency of the reference signal set as a frequency twice the frequency of the second frequency signal F2 obtained from the rotation analyzer 39, similar to the second lock-in detector 46A. Each of the first lock-in detectors 45A and 45B and the second lock-in detectors 46A and 46B may be configured of, for example, a field-programmable gate array (FPGA) or may be configured of a program that is software on a computer.

The electric field vector detection unit 47 is electrically connected to each of the second lock-in detectors 46A and 46B. The electric field vector detection unit 47 detects the first electric field vector of the terahertz wave T in the first polarization state on the basis of the first detection signal D1 from the second lock-in detector 46A, and detects the second electric field vector of the terahertz wave T in the second polarization state on the basis of the second detection signal D2 from the second lock-in detector 46B. The electric field vector detection unit 47 is physically configured of a computer system including, for example, a CPU, a memory, and a communication interface.

Here, a method of detecting the first electric field vector and the second electric field vector of the terahertz wave T will be described below. The following description is common to both the method of detecting the first electric field vector and the method of detecting the second electric field vector. Therefore, in the following description, the first electric field vector and the second electric field vector will simply be described as an "electric field vector" without being distinguished, and the first detection signal D1 and the second detection signal D2 will simply be described as a "detection signal" without being distinguished.

The following relationship is established between an amplitude $A_L$ and a phase $\varphi_L$ included in the detection signal and an amplitude $|E_T|$ and an orientation $\theta_T$ of the electric field vector of the terahertz wave T. $A_C$ in the following equation is an integer that is determined on the basis of, for example, a nonlinear optical constant and a thickness of the electro-optical crystal that is used as the terahertz wave detection element 30, and a wavelength of the probe light La. The electric field vector of the terahertz wave T can be uniquely determined on the basis of the detection results from the second lock-in detectors 46A and 46B using the following equations.

$$A_L = \frac{1}{2}\sin A_C |E_T|$$ [Math. 1]

$$\phi_L = \frac{\pi}{2} - \theta_T$$ [Math. 2]

When the amplitude of the electric field vector of the terahertz wave T is sufficiently small, the following equation is established. In this case, the amplitude $A_L$ included in the detection signal may be set as the amplitude $|E_T|$ of the electric field vector of the terahertz wave T as it is.

$$\sin A_C |E_T| \approx A_C |E_T|$$ [Math. 3]

The 2-phase lock-in detector can output $A_L \cos \varphi_L$ and $A_L \sin \varphi_L$ according to the phase of the reference signal. When the amplitude of the electric field vector of the terahertz wave T is sufficiently small, the following equation is established between the outputs and two mutually orthogonal components in the axial direction in the electric field vector of the terahertz wave T. Therefore, signals $E_{Tx}$ and $E_{Ty}$ proportional to the two mutually orthogonal components in the axial direction in the electric field vector of the terahertz wave T are obtained on the basis of the two outputs output from the second lock-in detector. In the embodiment, for example, in $E_{Tx}$, a horizontal direction is the axial direction, and in $E_{Ty}$, a vertical direction is the axial direction.

$$E_{Tx} \propto A_L \sin \phi_L$$ [Math. 4]

$$E_{Ty} \propto A_L \cos \phi_L$$ [Math. 5]

The optical parameter analysis unit 50 is electrically connected to the electric field vector detection unit 47. The optical parameter analysis unit 50 is a unit that analyzes the optical parameter of the measurement target S on the basis of the electric field vector measured by the electric field vector detection unit 47. The optical parameter analysis unit 50 is physically configured of a computer system including, for example, a CPU, a memory, and a communication interface. The optical parameter analysis unit 50 and the electric field vector detection unit 47 may be configured of the same computer system. For example, the optical parameter analysis unit 50 can store data of the measured electric field vector in a memory or the like and call the data as necessary.

The optical parameter analysis unit 50 of the embodiment acquires first analysis data on the basis of spectral data obtained by performing Fourier transformation on a product of the first electric field vector of the terahertz wave T in the first polarization state and a rotation matrix. Further, the optical parameter analysis unit 50 acquires second analysis data on the basis of spectral data obtained by performing Fourier transformation on a product of the second electric field vector of the terahertz wave T in the second polarization state and the rotation matrix. The optical parameter analysis unit 50 determines the optical parameter of the measurement target S from an intersection of the first analysis data and the second analysis data. Hereinafter, this will be described in detail. In the following description, the first electric field vector and the second electric field vector will simply be described as an "electric field vector" without being distinguished.

As described above, the electric field vector detection unit 47 acquires the signals $E_{Tx}$ and $E_{Ty}$ proportional to the two mutually orthogonal components in the axial direction in the electric field vector of the terahertz wave T. That is, when the electric field vector is E, E is expressed by the following equation.

$$E = \begin{pmatrix} E_{Tx} \\ E_{Ty} \end{pmatrix}$$ [Math. 6]

The optical parameter analysis unit 50 acquires the electric field vector E' on an axis tilted by an arbitrary analysis angle θ from an original axis serving as a reference by multiplying the electric field vector E by the rotation matrix as shown in the following equation. In the embodiment, the analysis angle θ is set in a range of 0° to 180°, and the electric field vector E' is acquired at arbitrary angular increments within the set range. In the electric field vector E', a component of the electric field vector E on the axis tilted by the angle θ from an axis of the signal $E_{Tx}$ is acquired as $E_{Tx}'$, and a component of the electric field vector E on an axis tilted by the angle θ from an axis of a signal $E_{Ty}$ is acquired as $E_{Ty}'$.

$$E' = \begin{pmatrix} E_{Tx}' \\ E_{Ty}' \end{pmatrix} = \begin{pmatrix} \cos\theta & \sin\theta \\ -\sin\theta & \cos\theta \end{pmatrix} \begin{pmatrix} E_{Tx} \\ E_{Ty} \end{pmatrix} = \begin{pmatrix} E_{Tx}\cos\theta + E_{Ty}\sin\theta \\ -E_{Ty}\sin\theta + E_{Ty}\cos\theta \end{pmatrix} \quad \text{[Math. 7]}$$

Then, the optical parameter analysis unit 50 executes analysis of transmission measurement at each analysis angle θ at which the electric field vector E' has been acquired, and derives a desired optical parameter. In this embodiment, the electric field vector measured in a state in which the measurement target S is placed in the placement portion 19 is taken as a sample measurement result, and the electric field vector measured in a state in which the measurement target S is not disposed in the placement portion 19 is taken as a reference measurement result. For example, when a real part of the refractive index is obtained, the optical parameter analysis unit 50 performs Fourier transformations on an $E_{Tx}'$ component of the electric field vector E' acquired according to the sample measurement result and the reference measurement result to obtain spectral data. Analysis data indicating a relationship between each analysis angle θ and the real part of the refractive index is acquired on the basis of a difference between the sample measurement result and the reference measurement result in the phase component of the spectral data and a thickness of a measurement target sample. The analysis data includes first analysis data based on the terahertz wave T in the first polarization state and second analysis data based on the terahertz wave T in the second polarization state. When only a difference (for example, a refractive index difference) between the two orthogonal axes (a slow axis and a fast axis) of the measurement target S is desired to be acquired, the reference measurement result is unnecessary. In this case, only the sample measurement is required.

Figure 5:
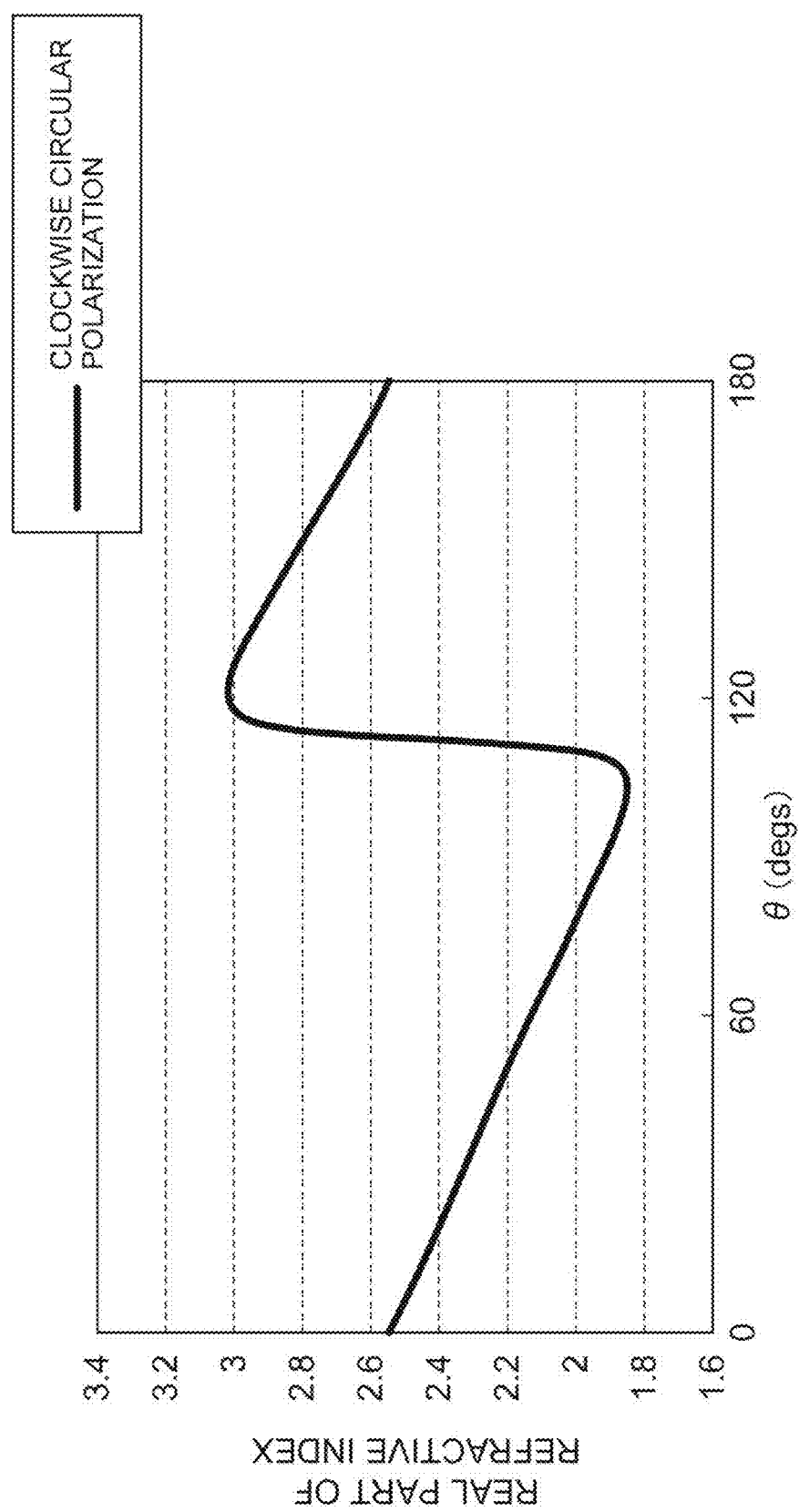
FIG. 5 is a diagram illustrating an analysis result of the optical parameter analysis unit.
Figure 6:
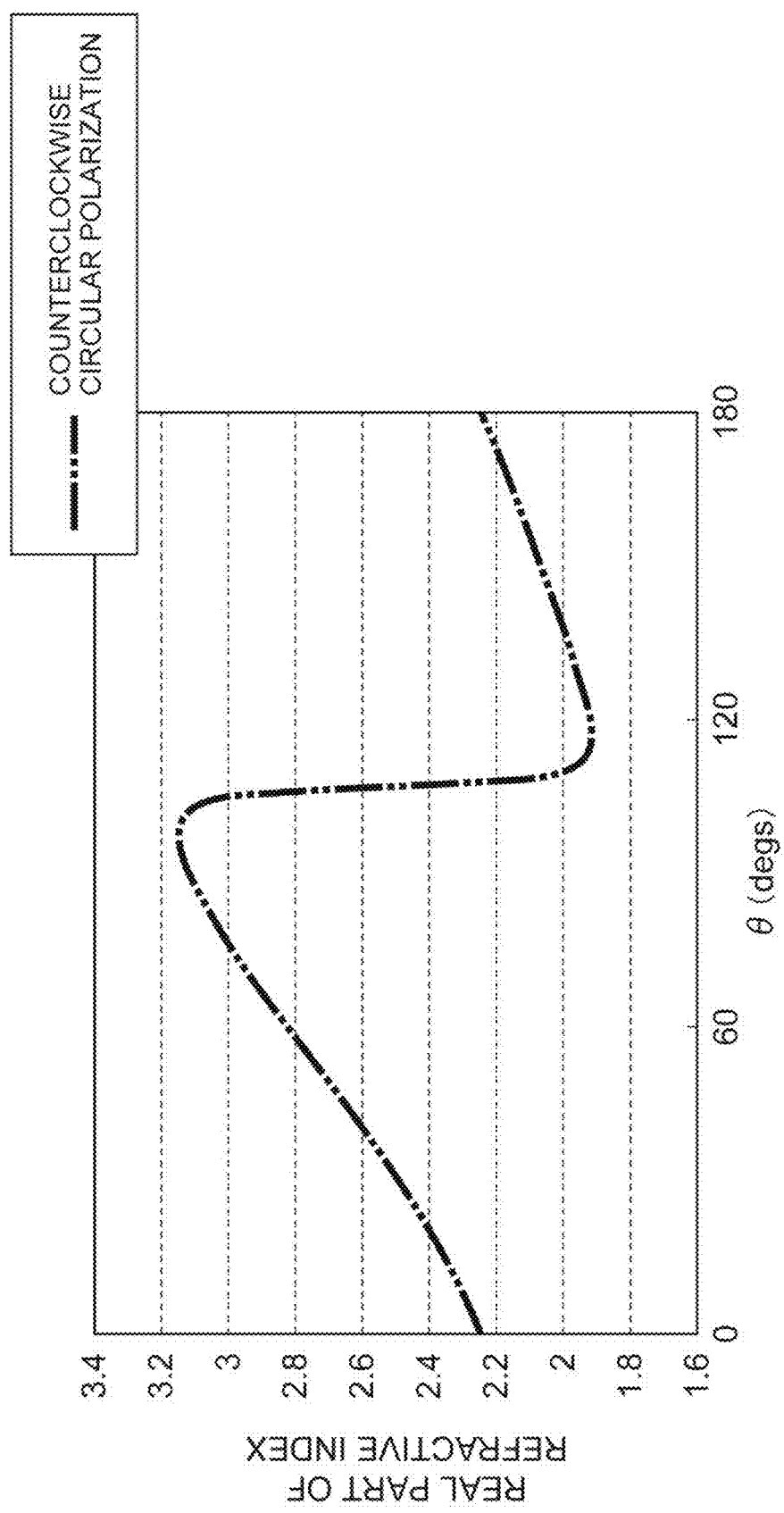
FIG. 6 is a diagram illustrating an analysis result of the optical parameter analysis unit.

FIGS. 5 and 6 are examples of the analysis data. The examples show analysis data when the measurement target S placed in a state in which an optical axis is inclined by 20° from an axis of the electric field vector E measured by the electric field vector detection unit 47 is measured. That is, this measurement target S has a slow axis at a position of 20° with an axis at which a signal $E_{Tx}$ serving as a reference is obtained as 0°, and has a fast axis at a position of 110°. The value of the real part of the refractive index in the slow axis is $n_o=2.4$ and the value of the real part of the refractive index in the fast axis is $n_e=2.0$.

FIG. 5 is a graph showing first analysis data measured using the terahertz wave T in the first polarization state. In the example of FIG. 5, the polarization state of the incident terahertz wave T is clockwise circular polarization. On the other hand, FIG. 6 is a graph showing second analysis data measured using the terahertz wave T in the second polarization state. In the example of FIG. 6, the polarization state of the incident terahertz wave T is counterclockwise circular polarization. In each of the graphs of FIGS. 5 and 6, a horizontal axis is the analysis angle θ, and a vertical axis is a calculated value of the real part of the refractive index.

Figure 7:
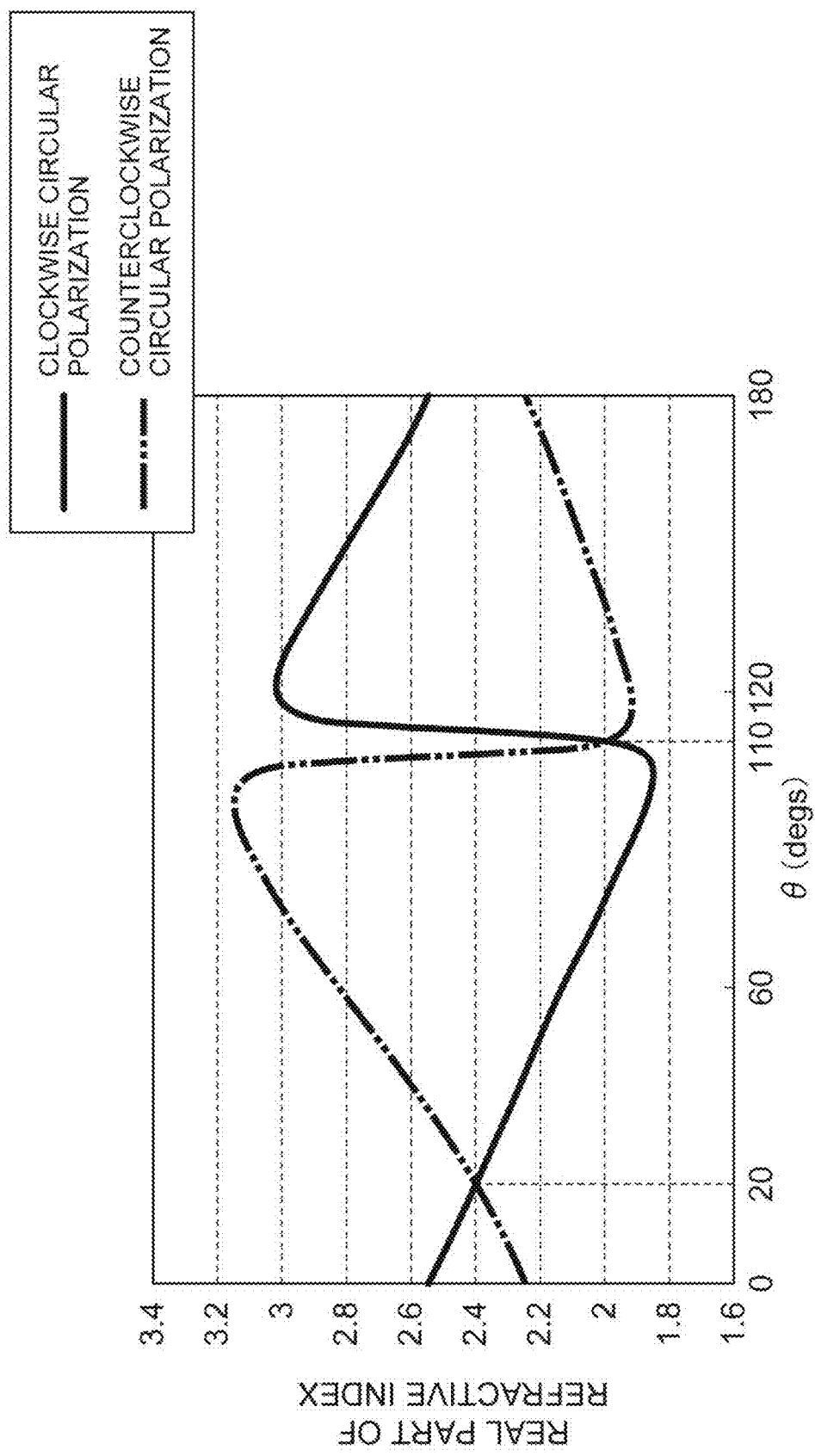
FIG. 7 is a diagram illustrating an analysis result of the optical parameter analysis unit.

FIG. 7 is a graph obtained by superimposing a graph showing the first analysis data and a graph showing the second analysis data. As illustrated in FIG. 7, the two graphs intersect at two places including a position at which the analysis angle θ is 20° and a position at which the analysis angle θ is 110°. The optical parameter analysis unit 50 derives the optical parameter at intersections of the graph showing the first analysis data and the graph showing the second analysis data. That is, in the example of FIG. 7, the optical parameter analysis unit 50 derives the orientation angles of 20° and 110° at the intersections as positions of the slow axis and the fast axis. Further, the optical parameter analysis unit 50 derives, as a value of the real part of the refractive index, the value of the real part of the refractive index of 2.4 at 20° that is one of the intersections and the value of the real part of the refractive index of 2.0 at 110° which is the other intersection.

Figure 8:
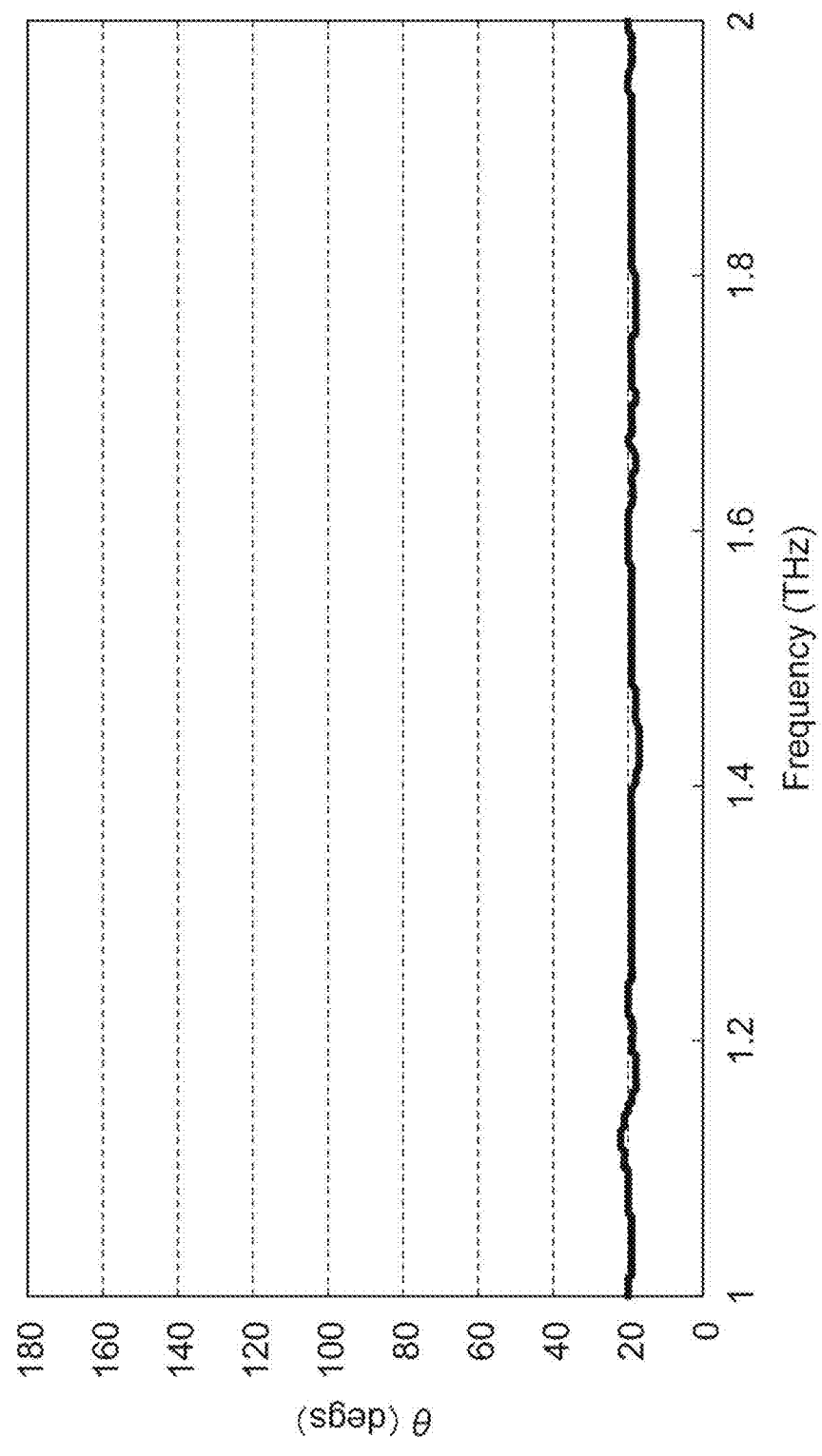
FIG. 8 is a diagram illustrating an analysis result of the optical parameter analysis unit.

In the embodiment, the terahertz wave T to be incident on the measurement target S includes at least frequency components in a band of 1 to 2 THz. Therefore, the optical parameter analysis unit 50 may derive the first analysis data and the second analysis data for frequency components different from each other. In this case, the optical parameter analysis unit 50 can derive the optical parameter in each frequency component. FIG. 8 is a graph in which the orientation of one optical axis derived in the frequency band from 1 THz to 2 THz has been plotted. The optical parameter analysis unit 50 can calculate an average value of the orientation obtained for each frequency component and determine the orientation value of the optical axis.

Figure 9:
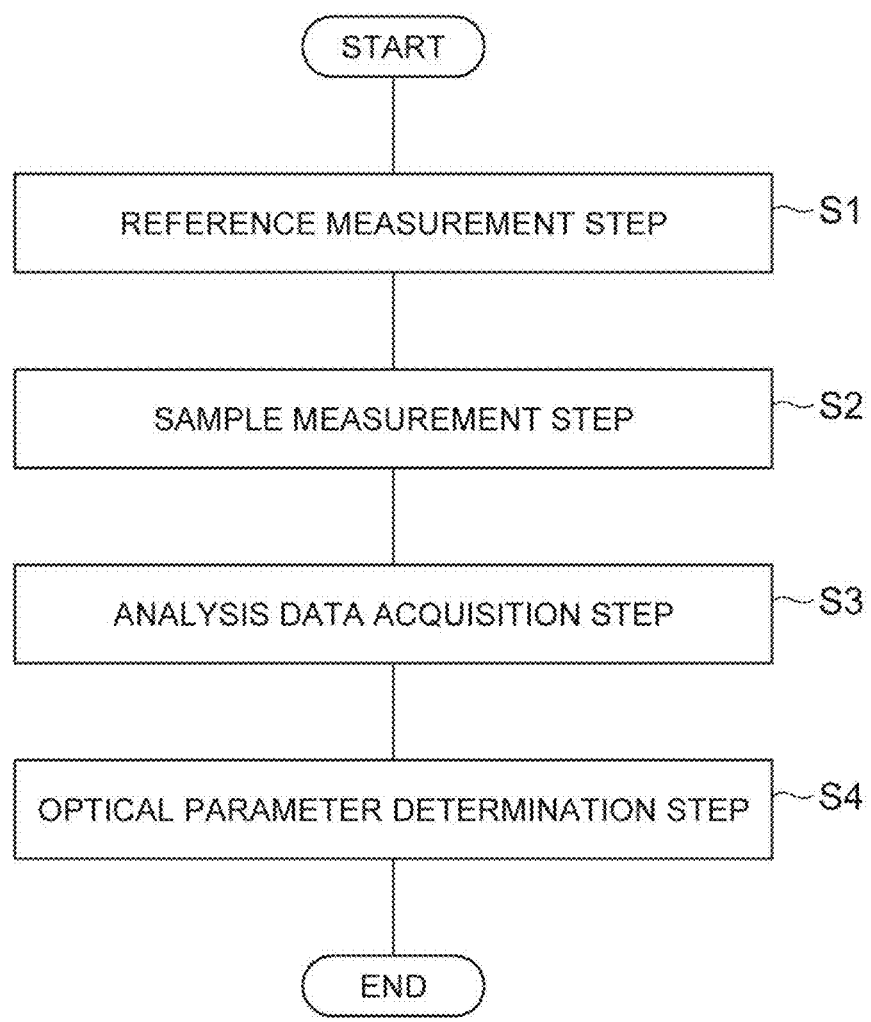
FIG. 9 is a flowchart showing an example of an optical analysis method according to an embodiment.

FIG. 9 is a flowchart showing an example of the optical analysis method in the embodiment. The optical analysis method can be executed using the optical analysis device 1 described above. As illustrated in FIG. 9, the optical analysis method includes a reference measurement step S1, a sample measurement step S2, an analysis data acquisition step S3, and an optical parameter determination step S4.

In the reference measurement step S1, in a state in which the measurement target S is not placed in the placement portion 19, the first electric field vector of the terahertz wave T in the first polarization state and the second electric field vector of the terahertz wave T in the second polarization state are measured. In the sample measurement step S2, in a state in which the measurement target S is placed in the placement portion 19, the first electric field vector of the terahertz wave T in the first polarization state and the second electric field vector of the terahertz wave T in the second polarization state transmitted through the measurement target S are measured. The reference measurement step S1 and the sample measurement step S2 are performed under the same environmental conditions.

Figure 10:
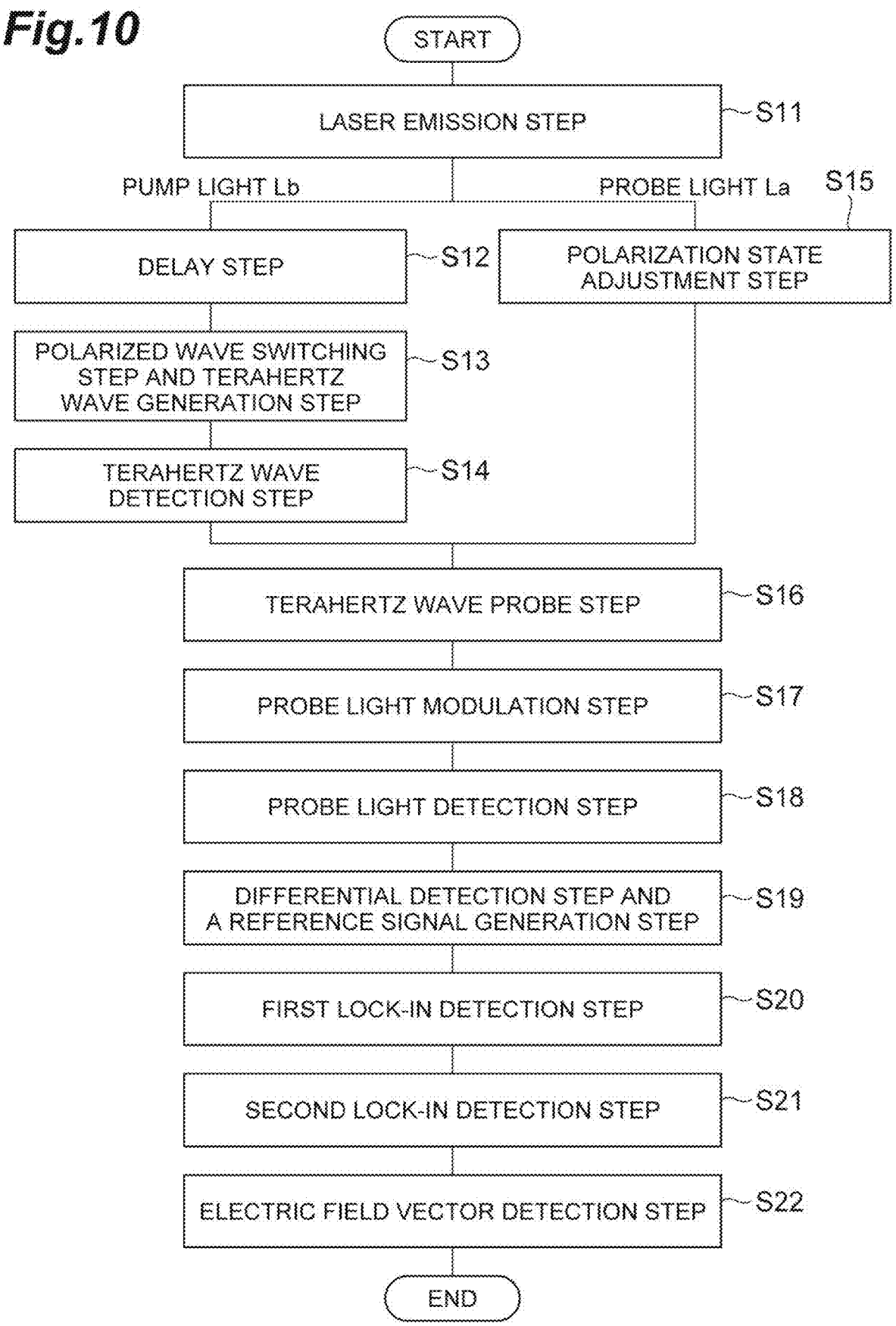
FIG. 10 is a flowchart showing an example of an electric field vector detection method.

FIG. 10 is a flowchart showing an example of a method of measuring the electric field vector common to the reference measurement step S1 and the sample measurement step S2.

As illustrated in FIG. 10, in this method of measuring the electric field vector, emission light L which is ultra-short pulsed light is first emitted by the light source 2 (step S11: laser emission step). The emission light L emitted from the light source 2 is divided into probe light La and pump light Lb by the beam splitter 3. The pump light Lb is delayed in time by passing through the delay stage 6 (step S12: delay step).

The pump light Lb having passed through the delay stage 6 is incident on the terahertz wave generation module 10 so that a terahertz wave T is generated (step S13: a polarized wave switching step and a terahertz wave generation step). In this case, the polarization state of the terahertz wave T generated from the nonlinear optical crystal 11 is periodically alternately switched between the first polarization state and the second polarization state that are different from each other, on the basis of the first frequency signal F1 output from the frequency signal generation unit 43. Step S13 is included in the terahertz wave generation step in this embodiment. The terahertz wave T generated by the terahertz wave generation module 10 is incident on the terahertz wave detection element 30 (step S14: a terahertz wave detection step). In this case, in the sample measurement step S2, the terahertz wave T is transmitted through the measurement target S. On the other hand, in the reference measurement step S1, the terahertz wave T is incident on the terahertz wave detection element 30 without being transmitted through the measurement target S.

On the other hand, the probe light La is guided to the polarization adjustment unit 32, and the polarization state is converted into circular polarization (step S15: a polarization state adjustment step). The probe light La of which the polarization state converted into circular polarization is incident on the terahertz wave detection element 30, and probing with the terahertz wave T is performed (step S16: terahertz wave probe step). In this case, the polarization state of the terahertz wave T varies according to the electric field vector of the terahertz wave T.

The probe light La after the probing is modulated by the rotation analyzer 39 (step S17: probe light modulation step) and detected by the first photodetector 34A (step S18: probe light detection step). On the other hand, the probe light La not used for the probing is detected by the second photodetector 34B.

Then, the detection signals from the first photodetector 34A and the second photodetector 34B are output to the differential detector 41, and differential detection is performed. Further, the first reference signal R1 is generated by the first reference signal generator 44A, and the second reference signal R2 is generated by the second reference signal generator 44B (step S19: a differential detection step and a reference signal generation step). The detection signal D from the differential detector 41 is output to the first lock-in detectors 45A and 45B. The first reference signal R1 is output to the first lock-in detector 45A, and the second reference signal R2 is output to the first lock-in detector 45B.

When the first reference signal R1 is input to the first lock-in detector 45A, only the first detection signal D1 between the first detection signal D1 and the second detection signal D2 included in the detection signal D is detected by referring to the first reference signal R1. On the other hand, when the second reference signal R2 is input to the first lock-in detector 45B, only the second detection signal D2 is detected by referring to the second reference signal R2 (step S20: a first lock-in detection step). The first detection signal D1 detected by the first lock-in detector 45A is output to the second lock-in detector 46A, and the second detection signal D2 detected by the first lock-in detector 45B is output to the second lock-in detector 46B.

When the first detection signal D1 from the first lock-in detector 45A is output to the second lock-in detector 46A, detection of lock-in of the first detection signal D1 is performed, for example, using a frequency that is twice the frequency of the second frequency signal F2 from the rotation analyzer 39 for a reference signal. On the other hand, when the second detection signal D2 from the first lock-in detector 45B is output to the second lock-in detector 46B, lock-in detection of the second detection signal D2 is performed, for example, using a frequency twice the frequency of the second frequency signal F2 for a reference signal (step S21: a second lock-in detection step). The first detection signal D1 from the second lock-in detector 46A is output to the electric field vector detection unit 47, and the amplitude and the direction of the first electric field vector of the terahertz wave T are detected on the basis of the amplitude and the phase included in the first detection signal D1. On the other hand, the second detection signal D2 from the second lock-in detector 46B is output to the electric field vector detection unit 47, and the amplitude and direction of the second electric field vector of the terahertz wave T are detected on the basis of the amplitude and the phase included in the second detection signal D2 (step S22: an electric field vector detection step).

Referring back to FIG. 9, in the analysis data acquisition step S3, the first analysis data is acquired on the basis of the first electric field vector obtained in the reference measurement step S1 and the first electric field vector obtained in the sample measurement step S2. In the analysis data acquisition step S3, the second analysis data is acquired on the basis of the second electric field vector obtained in the reference measurement step S1 and the second electric field vector obtained in the second sample measurement step S2.

Subsequently, in the optical parameter determination step S4, the optical parameter of the measurement target S is determined from the intersection of the first analysis data and the second analysis data acquired in the analysis data acquisition step S3. Each of the analysis data acquisition step S3 and the optical parameter determination step S4 is executed by the optical parameter analysis unit 50. These steps S3 and S4 are included in the analysis step in this embodiment.

In the optical analysis device 1 and the optical analysis method described above, the first electric field vector of the terahertz wave T in the first polarization state and the second electric field vector of the terahertz wave T in the second polarization state input to the measurement target S are measured, and the first analysis data and the second analysis data including the optical parameter of the measurement target S are acquired by analyzing results of the measurement. Here, since the optical parameter of the measurement target S does not depend on the polarization state of the terahertz wave T, a correct value of the optical parameter is common in both the first analysis data and the second analysis data. Therefore, it is possible to uniquely determine the optical parameter of the measurement target S from the intersection of the first analysis data and the second analysis data.

In the optical analysis device 1 and the optical analysis method, the polarization state of the terahertz wave T transmitted through the measurement target S is periodically switched between the first polarization state (clockwise circular polarization) and the second polarization state (counterclockwise circular polarization) that are different from each other on the basis of the first frequency signal F1, and the first electric field vector and the second electric field vector of the terahertz wave T are detected by referring to the first reference signal R1 and the second reference signal R2 on the basis of the first frequency signal F1. Accordingly, it is possible to easily switch the polarization state of the terahertz wave T and efficiently measure the first electric field vector and the second electric field vector to be used for a determination of the optical parameter of the measurement target S. Specifically, it is possible to measure the first electric field vector and the second electric field vector at a time in each of the reference measurement step S1 and the sample measurement step S2. Therefore, it is possible to easily measure the optical parameter of the measurement target S.

The optical parameter analysis unit 50 obtains the first analysis data using, as a reference, the first electric field vector obtained in a state in which the measurement target S is not placed in the placement portion 19 and also obtains the second analysis data using, as a reference, the second electric field vector obtained in a state in which the measurement target S is not placed in the placement portion 19. Since the first electric field vector and the second electric field vector of the measured terahertz wave T are used as references by using, as a reference, the terahertz wave in a state in which the measurement target S is not placed in this way, it is possible to derive an absolute value of the optical parameter. When the reference is not used, it is possible to derive a difference between the optical parameters in the fast axis and the slow axis.

The electric field vector measurement unit 40 includes a reference signal generation unit 42 that generates the first reference signal R1 corresponding to the first frequency signal F1 and the second reference signal R2 of which a phase is inverted with respect to the first reference signal R1, and the electric field vector detection unit 47 that detects the first electric field vector using the first reference signal R1 and detects the second electric field vector using the second reference signal R2. Accordingly, it is possible to accurately distinguish and detect the first electric field vector of the terahertz wave T in the first polarization state and the second electric field vector of the terahertz wave T in the second polarization state.

The polarization switching unit 13 includes the Pockels cell 15 that switches the polarization state of the pump light Lb directed to the nonlinear optical crystal 11 according to the applied voltage, and the Pockels cell driving unit 16 that applies a voltage to the Pockels cell 15 at a cycle based on the first frequency signal F1. In this case, switching of the polarization state of the terahertz wave T can be performed with a simple configuration.

The polarization switching unit 13 includes the ½ wave plate 14, the ¼ wave plate 17, the nonlinear optical crystal 11, and the terahertz wave plate 18. The polarization switching unit 13 switches the polarization state of the terahertz wave T with the linear polarization generated in the nonlinear optical crystal 11 between clockwise circular polarization and counterclockwise circular polarization. By using the clockwise circular polarization and the counterclockwise circular polarization, it is possible to prevent complication of calculation when the first analysis data and the second analysis data are acquired from the first electric field vector and the second electric field vector.

The terahertz wave generation unit 11 includes the nonlinear optical crystal. The nonlinear optical crystal has a property of generating the terahertz wave T according to the incidence of the pump light Lb and converting the polarization state of the terahertz wave T. By using this property, it is possible to suitably realize the first polarization state and the second polarization state of the terahertz wave T.

The terahertz wave T includes a plurality of different frequency components, and the optical parameter analysis unit 50 determines the optical parameter for each of a plurality of frequency components. In this case, for example, it is possible to improve measurement accuracy by obtaining an average of the optical parameters acquired for the respective frequency components.

The optical parameter analysis unit 50 may derive an indicator of variation of the optical parameter analyzed for each of the plurality of frequency components. For example, it is possible to improve the measurement accuracy by selecting a parameter with a small degree of variation when the orientation of the optical axis of the anisotropic material is determined.

First Modification Example

Figure 11:
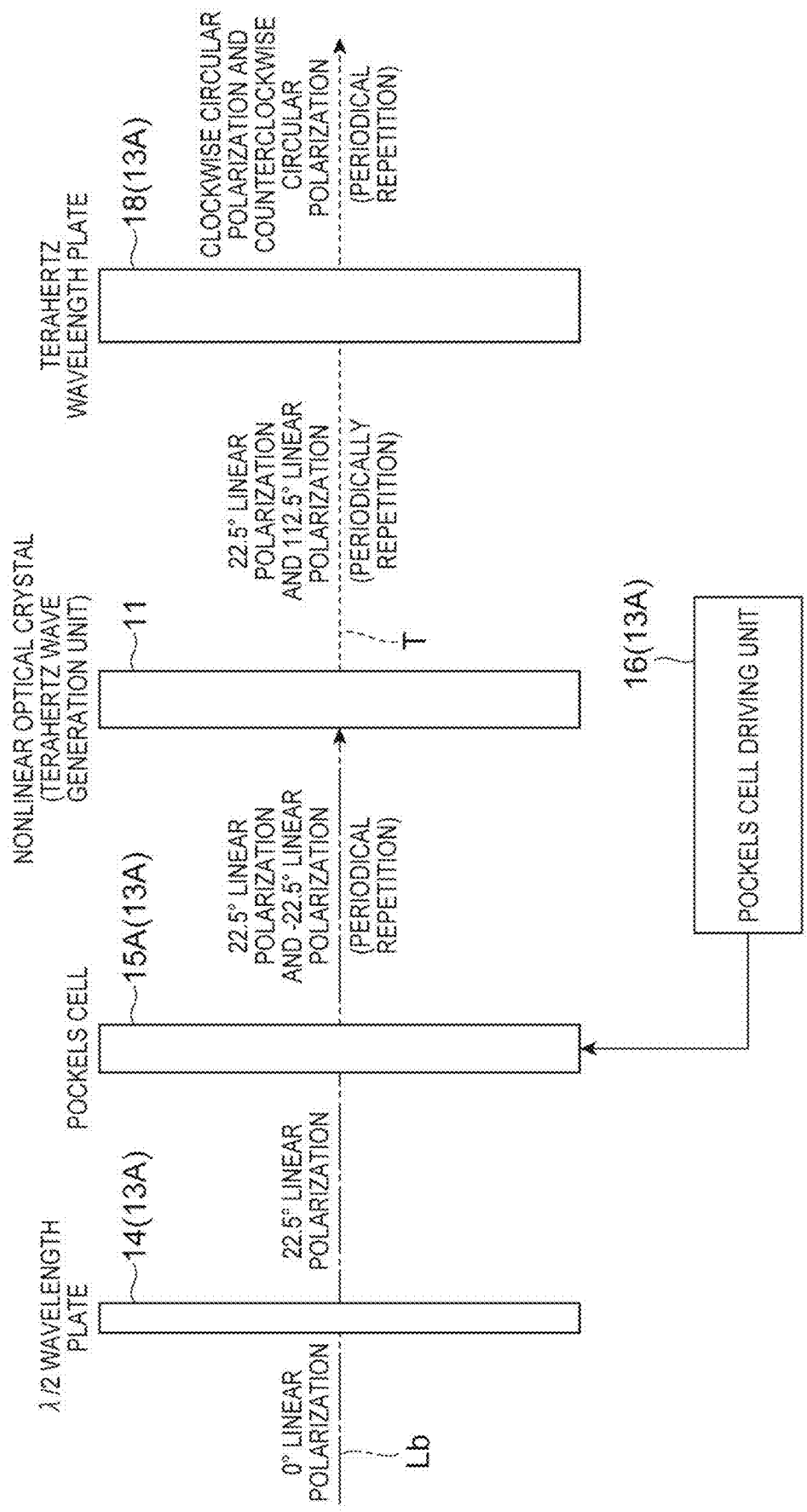
FIG. 11 is a configuration diagram illustrating a terahertz wave generation module according to a first modification example.

FIG. 11 is a configuration diagram illustrating a terahertz wave generation module 10A according to a first modification example of the embodiment. A difference between the embodiment and this modification example is that the terahertz wave generation module 10A according to the first modification example includes a polarization switching unit 13A instead of the polarization switching unit 13. The polarization switching unit 13A includes a ½ wave plate 14, a Pockels cell 15A, a Pockels cell driving unit 16, and a terahertz wave plate 18.

In the modification example, the ½ wave plate 14 converts the polarization state of the pump light Lb from 0° linear polarization to 22.5° linear polarization. The Pockels cell 15A is different from the Pockels cell 15 of the embodiment in that the Pockels cell 15A functions as a ½ wave plate in a period in which a voltage is applied. A thickness of the Pockels cell 15A in a traveling direction of the pump light Lb is, for example, 25 mm. According to the voltage periodically applied by the Pockels cell driving unit 16, the polarization state of the pump light Lb being incident from the ½ wave plate 14 and passing through the Pockels cell 15A is periodically switched between 22.5° linear polarization and −22.5° linear polarization.

In the first modification example, when the polarization state of the pump light Lb incident from the ½ wave plate 14 is 22.5° linear polarization, the nonlinear optical crystal 11 generates a terahertz wave T of 22.5° linear polarization. On the other hand, when the polarization state of the pump light Lb incident from the ½ wave plate 14 is −22.5° linear polarization, the nonlinear optical crystal 11 generates the terahertz wave T of 112.5° linear polarization.

The terahertz wave plate 18 is disposed at a stage after the nonlinear optical crystal 11. Specifically, the terahertz wave plate 18 is disposed on an optical path between the nonlinear optical crystal 11 and the terahertz wave detection element 30. The terahertz wave plate 18 is a ¼ wave plate that is applicable to the terahertz wave T. In this modification example, the terahertz wave plate 18 converts the polarization state of the incident terahertz wave T from 22.5° linear polarization to clockwise circular polarization (a first polarization state). In addition, the terahertz wave plate 18 converts the polarization state of the incident terahertz wave T from 112.5° linear polarization to counterclockwise circular polarization (a second polarization state).

Summarizing the operation of the terahertz wave generation module 10A having the above configuration, the ½ wave plate 14 converts the polarization state of the pump light Lb from 0° linear polarization to 22.5° linear polarization, and the Pockels cell 15A periodically converts the polarization state of the pump light Lb into 22.5° linear polarization or −22.5° linear polarization according to the presence or absence of application of a voltage from the Pockels cell driving unit 16. When the pump light Lb of he 22.5° linear polarization is incident, the nonlinear optical crystal 11 generates the terahertz wave T of 22.5° linear polarization, and when the pump light Lb of −22.5° linear polarization is incident, the nonlinear optical crystal 11 generates the terahertz wave T of 112.5° linear polarization. The terahertz wave plate 18 converts the terahertz wave T of 22.5° linear polarization into the terahertz wave T of clockwise circular polarization and converts the terahertz wave T of 112.5° linear polarization into the terahertz wave T of counterclockwise circular polarization. Therefore, in the terahertz wave generation module 10A, the terahertz wave T of clockwise circular polarization and the terahertz wave T of counterclockwise circular polarization are periodically output on the basis of the first frequency signal F1. With such a configuration, it is also possible to achieve the same effects as those in the embodiment. That is, the complexity of calculation when the first analysis data and the second analysis data are respectively acquired from the first electric field vector and the second electric field vector can be prevented by using the clockwise circular polarization and counterclockwise circular polarization.

Second Modification Example

Figure 12:
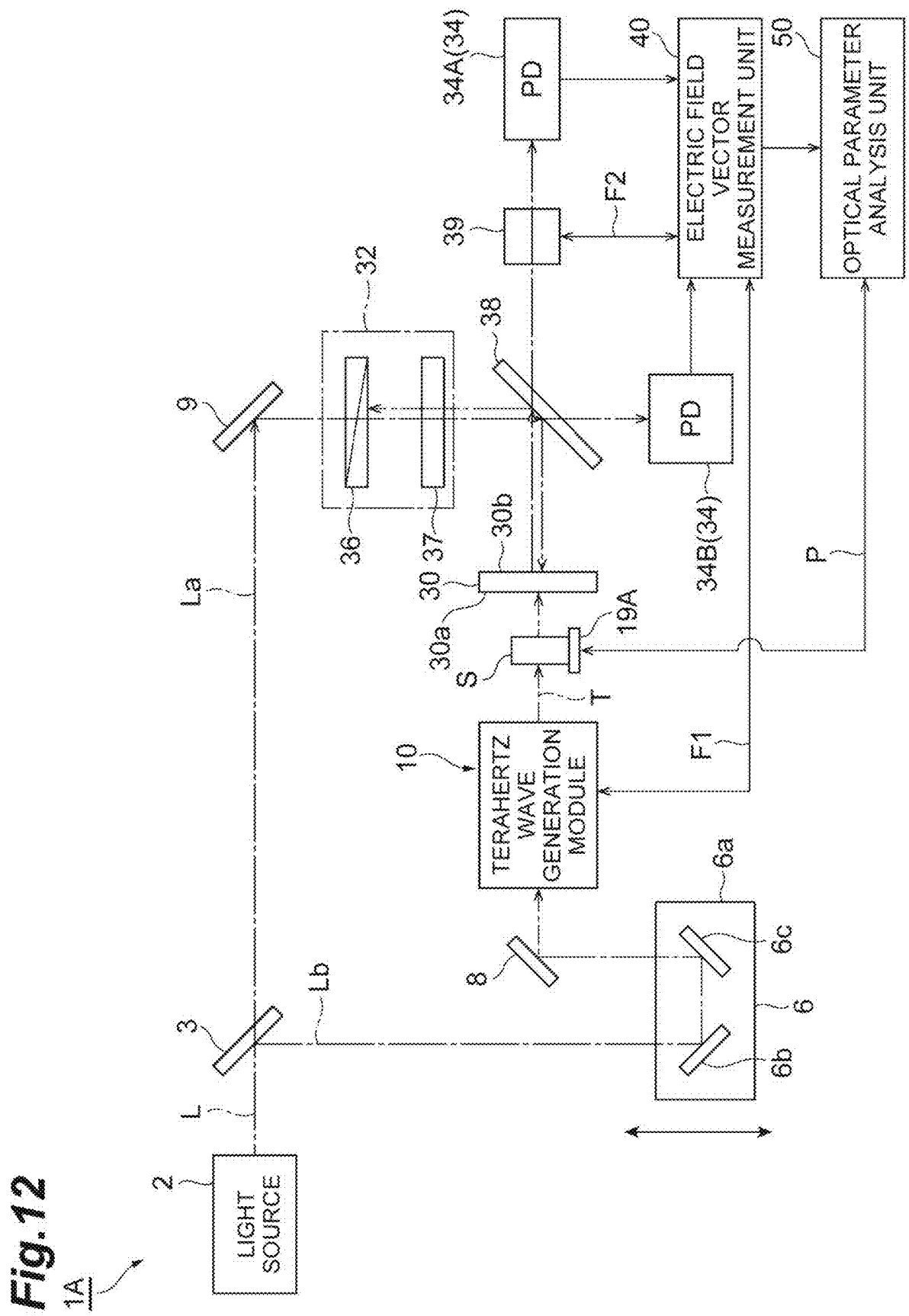
FIG. 12 is a configuration diagram illustrating an optical analysis device according to a second modification example.

FIG. 12 is a configuration diagram illustrating an optical analysis device 1A according to a second modification example of the embodiment. The optical analysis device 1A of this modification example is different from the optical analysis device 1 of the embodiment in that the placement portion 19 is a stage 19A that moves the measurement target S. The stage 19A adjusts a position of the measurement target S on a plane perpendicular to a traveling direction of the terahertz wave T generated from the terahertz wave generation module 10. The stage 19A is electrically connected to the optical parameter analysis unit 50, and outputs position information P indicating a position of the measurement target S on the plane to the optical parameter analysis unit 50.

In the optical analysis device 1A, the position information P of the measurement target S can be acquired and the electric field vector of the terahertz wave T can be measured while the position of the measurement target S being moved using the stage 19A, and therefore, it is possible to acquire an optical parameter at each position of the measurement target S. Furthermore, in the optical analysis device 1A, it is possible to map the optical parameter at each position of the measurement target S to the position information P from the stage 19A using the position information P.

In the second modification example, when the electric field vector (that is, the first electric field vector and the second electric field vector) of the terahertz wave T of the measurement target S is first measured at a predetermined position, the position of the measurement target S is moved, and then, the electric field vector of the terahertz wave T is measured at each position of the measurement target S, that is, when the electric field vectors of the second and subsequent terahertz waves T are measured, the reference measurement step S1 can be omitted. This is because the reference electric field vector necessary for the electric field vector of the terahertz wave T to be acquired at each position of the measurement target S (that is, the electric field vector obtained in the reference measurement step S1) is common, and therefore, when the reference electric field vector obtained at a time of first measuring the electric field vector of the terahertz wave T of the measurement target S is stored temporarily in the optical parameter analysis unit 50, it is not necessary for the reference electric field vector to be measured again in subsequent measurement of the electric field vector.

Third Modification Example

In the embodiment, an example in which the optical parameter analysis unit 50 derives the first analysis data and the second analysis data for each of the different frequency components to derive the optical parameter in each frequency component has been shown. The third modification example is different from the embodiment only in that a function of deriving an indicator of variation of the optical parameter analyzed for each frequency component is added as a function of the optical parameter analysis unit 50.

Figure 13:
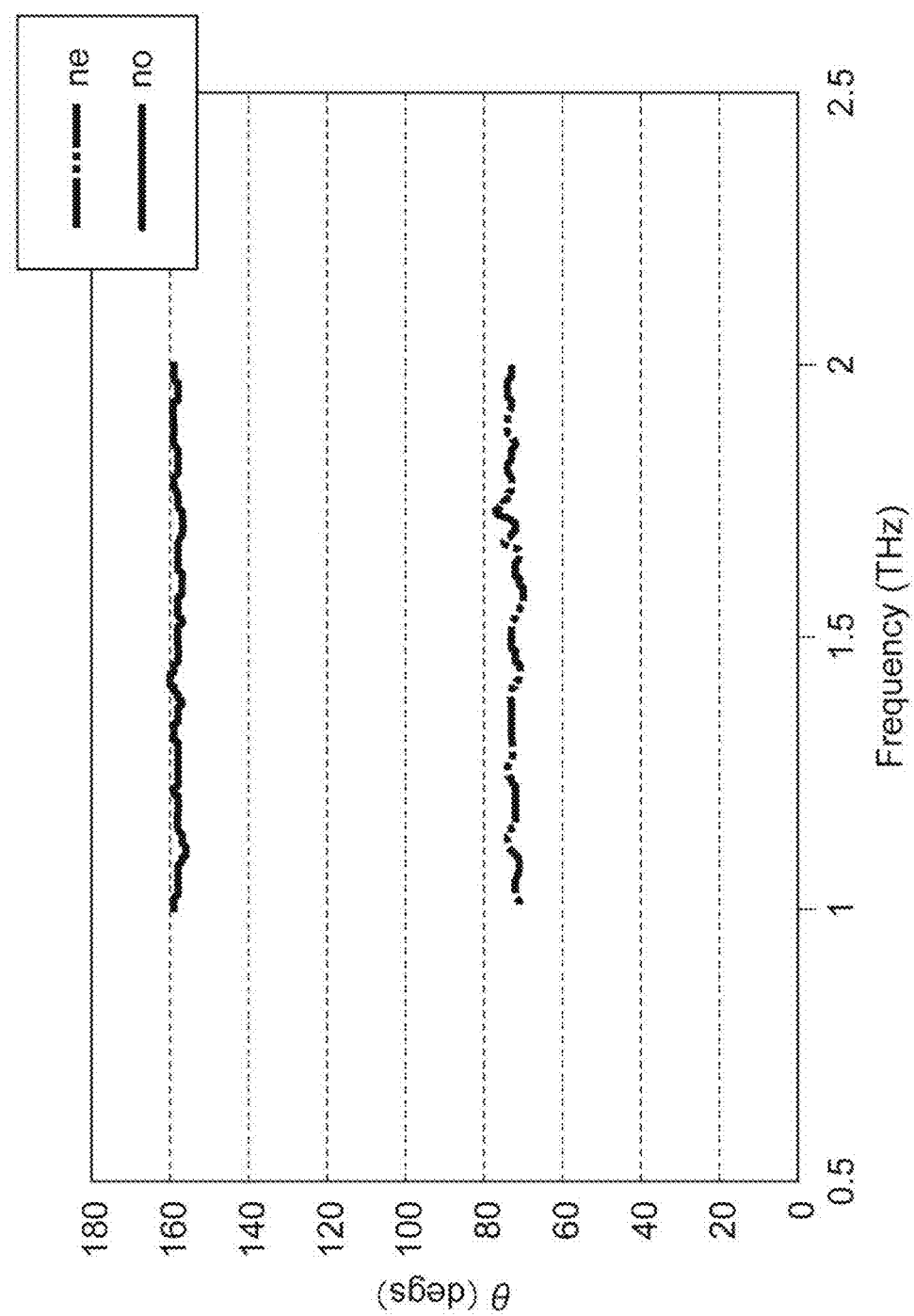
FIG. 13 is a diagram illustrating an analysis result of an optical parameter analysis unit according to a third modification example.

In the optical parameter analysis unit 50 of the embodiment, orientation angles of two orthogonal axes (the fast axis and the slow axis) are derived for different frequency components. FIG. 13 is an example of a graph in which the orientations of the fast axis and the slow axis derived in a frequency band of 1 THz to 2 THz have been plotted. As illustrated in FIG. 13, the orientations of the fast axis and the slow axis vary according to the frequency. In the third modification example, the optical parameter analysis unit 50 derives an indicator of variation of each of the orientations of the fast axis and the slow axis. An example of an indicator of variation includes a variance or a standard deviation. The optical parameter analysis unit 50 selects the orientation of the axis with a smaller degree of variation.

Further, the optical parameter analysis unit 50 determines the value of the orientation of the one of the axes by calculating the average value of the selected orientation in the axis. The optical parameter analysis unit 50 determines the value of the orientation of the other axis by calculating the orientation orthogonal to the determined value of the orientation. Thus, it is possible to improve the measurement accuracy by selecting a parameter with a small degree of variation.

Although the embodiment and the examples have been described in detail with reference to the drawings, specific configurations are not limited to the embodiment and the examples and various other modifications can be performed. For example, the embodiment and the modification examples may be combined with each other according to necessary purposes and effects. Measurement of the electric field vector of the terahertz wave T transmitted through the measurement target S can be executed using another measurement method other than the above measurement method. In the embodiment and the examples, an electro-optical crystal obtained by cutting out the (111) plane of ZnTe which is an optical isotropic medium is exemplified as the terahertz wave detection element 30. However, the electro-optical crystal may be a crystal obtained by cutting out a (111) plane of another optically isotropic medium such as GaP.

Although the polarization switching unit 13 switches the terahertz wave T to clockwise circular polarization and counterclockwise circular polarization in the embodiment and the examples, the present disclosure is not limited thereto. The polarization switching unit 13 may be able to switch the terahertz wave T to a first polarization state and a second polarization state that are different from each other. For example, the polarization switching unit 13 may switch the terahertz wave T between clockwise elliptical polarization and counterclockwise elliptical polarization, and may switch the terahertz wave T between diagonally right 45° linear polarization and diagonally left 45° linear polarization.

In the embodiment and the examples, the example in which the orientation of the optical axis and the real part of the refractive index are analyzed has been shown, but the present disclosure is not limited thereto and an absorption coefficient, a dielectric constant, and the like can be analyzed as other optical parameters. In this case, when the orientation of the optical axis has already been analyzed on the same measurement target, other optical parameters can be derived using the orientation of the optical axis that has already been analyzed.

In the derivation of the intersection of the first analysis data and the second analysis data, it is not necessary to actually superimpose graphs and a value of the intersection can be derived through calculation.

In the embodiment and the examples, the example in which the complex refractive index of the anisotropic material is acquired has been shown, but the present disclosure is not limited thereto. For example, since responses of the measurement target S to clockwise circular polarization and counterclockwise circular polarization are obtained, it is possible to acquire an optical rotation and a circular dichroism of the measurement target S by comparing the responses.

In the embodiment and the examples, the reference signal generation unit 42 includes the frequency signal generation unit 43. However, the Pockels cell driving unit 16 may include the frequency signal generation unit 43. In the embodiment and the examples, the rotation analyzer 39 generates the second frequency signal F2. However, the second lock-in detectors 46A and 46B may generate the second frequency signal F2.

What is claimed is:

1. An optical analysis device that analyzes an optical parameter of a measurement target having anisotropy, the optical analysis device comprising:
   a terahertz wave generation module that generates a terahertz wave;
   a terahertz wave detection unit that detects the terahertz wave generated by the terahertz wave generation module;
   a placement portion for the measurement target disposed on an optical path of the terahertz wave between the terahertz wave generation module and the terahertz wave detection unit;
   an electric field vector measurement unit that measures an electric field vector of the terahertz wave detected by the terahertz wave detection unit;
   an optical parameter analysis unit that analyzes an optical parameter of the measurement target on the basis of a measurement result of the electric field vector from the electric field vector measurement unit; and
   a frequency signal generation unit that generates a predetermined frequency signal,
   wherein the terahertz wave generation module includes
   a terahertz wave generation unit that generates the terahertz wave according to incidence of light, and
   a polarization switching unit that periodically switches a polarization state of the terahertz wave between a first polarization state and a second polarization state that are different from each other on the basis of the frequency signal,
   the electric field vector measurement unit detects a first electric field vector of the terahertz wave in the first polarization state and a second electric field vector of the terahertz wave in the second polarization state by referring to the frequency signal, and
   the optical parameter analysis unit determines an optical parameter of the measurement target from an intersection between first analysis data based on spectral data obtained by performing Fourier transformation on a product of the first electric field vector and a rotation matrix and second analysis data based on spectral data obtained by performing Fourier transformation on a product of the second electric field vector and the rotation matrix.

2. The optical analysis device according to claim 1, wherein the optical parameter analysis unit obtains the first analysis data using, as a reference, the first electric field vector obtained in a state in which the measurement target is not placed in the placement portion and also obtains the second analysis data using, as a reference, the second electric field vector obtained in a state in which the measurement target is not placed in the placement portion.

3. The optical analysis device according to claim 1, wherein the electric field vector measurement unit includes
   a reference signal generation unit that generates a first reference signal corresponding to a first frequency signal and a second reference signal of which a phase is inverted with respect to the first reference signal, and
   an electric field vector detection unit that detects the first electric field vector using the first reference signal and detects the second electric field vector using the second reference signal.

4. The optical analysis device according to claim 1, wherein the polarization switching unit includes
   an electro-optical element that switches a polarization state of the light directed to the terahertz wave generation unit according to an applied voltage, and
   a voltage application unit that applies a voltage to the electro-optical element at a period based on the frequency signal.

5. The optical analysis device according to claim 4, wherein the polarization switching unit includes
   a ½ wave plate disposed at a state before the electro-optical element,
   a ¼ wave plate disposed at a stage after the electro-optical element,
   a nonlinear optical crystal disposed at a stage after the ¼ wave plate, and
   a terahertz wave plate disposed at a stage after the nonlinear optical crystal,
   wherein a polarization state of the terahertz wave of linear polarization generated in the nonlinear optical crystal is switched between clockwise circular polarization and counterclockwise circular polarization.

6. The optical analysis device according to claim 4, wherein the polarization switching unit includes:
   a ½ wave plate disposed at a stage before the electro-optical element,
   a nonlinear optical crystal disposed at a stage after the electro-optical element, and
   a terahertz wave plate disposed at a stage after the nonlinear optical crystal,
   wherein a polarization state of the terahertz wave of linear polarization generated in the nonlinear optical crystal is switched between clockwise circular polarization and counterclockwise circular polarization.

7. The optical analysis device according to claim 1, wherein the terahertz wave generation unit includes a nonlinear optical crystal.

8. The optical analysis device according to claim 1, wherein the optical parameter includes at least one of an orientation angle of an optical axis, a refractive index, an extinction coefficient, and a dielectric constant.

9. The optical analysis device according to claim 1,
wherein the terahertz wave includes a plurality of frequency components, and
the optical parameter analysis unit determines the optical parameter for each of the plurality of frequency components.

10. The optical analysis device according to claim 9, wherein the optical parameter analysis unit derives an indicator of variation of the optical parameter analyzed for each of the plurality of frequency components.

11. An optical analysis method of analyzing an optical parameter of a measurement target having anisotropy, the optical analysis method comprising:
  a terahertz wave generation step of generating a terahertz wave;
  a sample measurement step of measuring an electric field vector of the terahertz wave input to the measurement target; and
  an analysis step of analyzing an optical parameter of the measurement target on the basis of a measurement result of the electric field vector obtained in the sample measurement step,
  wherein the terahertz wave generation step includes generating the terahertz wave according to incidence of light, and periodically switching a polarization state of the terahertz wave between a first polarization state and a second polarization state that are different from each other on the basis of a predetermined frequency signal,
  the sample measurement step includes detecting a first electric field vector of the terahertz wave in the first polarization state and a second electric field vector of the terahertz wave in the second polarization state by referring to the frequency signal, and
  the analysis step includes determining an optical parameter of the measurement target from an intersection between first analysis data based on spectral data obtained by performing Fourier transformation on a product of the first electric field vector and a rotation matrix and second analysis data based on spectral data obtained by performing Fourier transformation on a product of the second electric field vector and the rotation matrix.

* * * * *